United States Patent [19]

Suzuki

[11] Patent Number: 5,661,617
[45] Date of Patent: Aug. 26, 1997

[54] HEAD POSITIONING CONTROL SYSTEM

[75] Inventor: Nobuyuki Suzuki, Kawasaki, Japan

[73] Assignee: Fujitsu Limited, Kawasaki, Japan

[21] Appl. No.: 430,291

[22] Filed: Apr. 28, 1995

Related U.S. Application Data

[63] Continuation of Ser. No. 26,544, Mar. 4, 1993, abandoned.

[30] Foreign Application Priority Data

Mar. 31, 1992 [JP] Japan ................... 4-076441

[51] Int. Cl.$^6$ .................................. G11B 5/596
[52] U.S. Cl. ...................... 360/78.04; 360/77.05
[58] Field of Search .......................... 360/75, 77.02, 360/77.05, 77.04, 78.13, 78.04

[56] References Cited

U.S. PATENT DOCUMENTS 4,679,103  7/1987  Workman ..................... 360/78.14
5,153,789  10/1992  Bernett et al. ................ 360/78.04
5,187,620  2/1993  Notake et al. ................ 360/77.04
5,208,711  5/1993  Kitamura et al. ............. 360/77.05
5,307,330  4/1994  Okamura ...................... 369/32

FOREIGN PATENT DOCUMENTS 2297703  12/1990  Japan .
3222172  10/1991  Japan .

*Primary Examiner*—A. Psitos
*Assistant Examiner*—James T. Wilson
*Attorney, Agent, or Firm*—Greer, Burns & Crain, Ltd.

[57] ABSTRACT

A head positioning control system applied to a magnetic disk unit in which a positioning operation is carded out with reference to a history of past positioning errors stored in memory. A control unit determines whether or not the head is on-track by comparing past position error signals stored in memory to current position signals. The target position is compensated according to the past position error when the target position is designated.

18 Claims, 24 Drawing Sheets

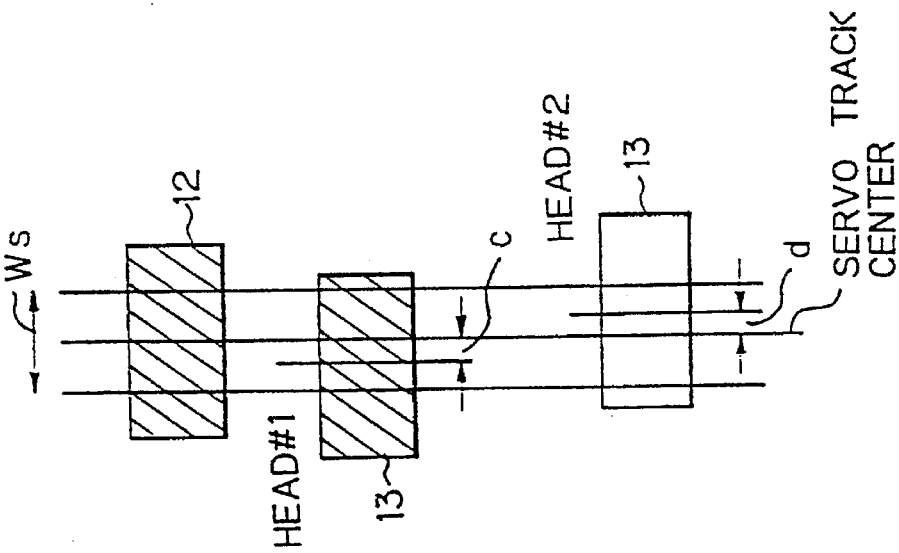
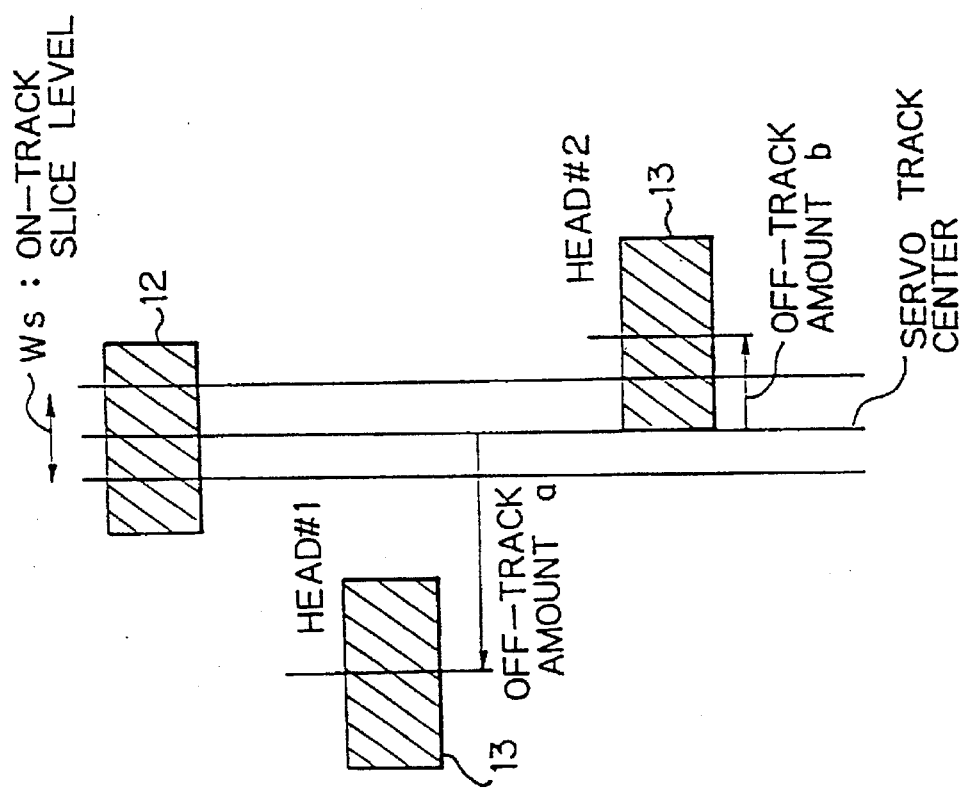

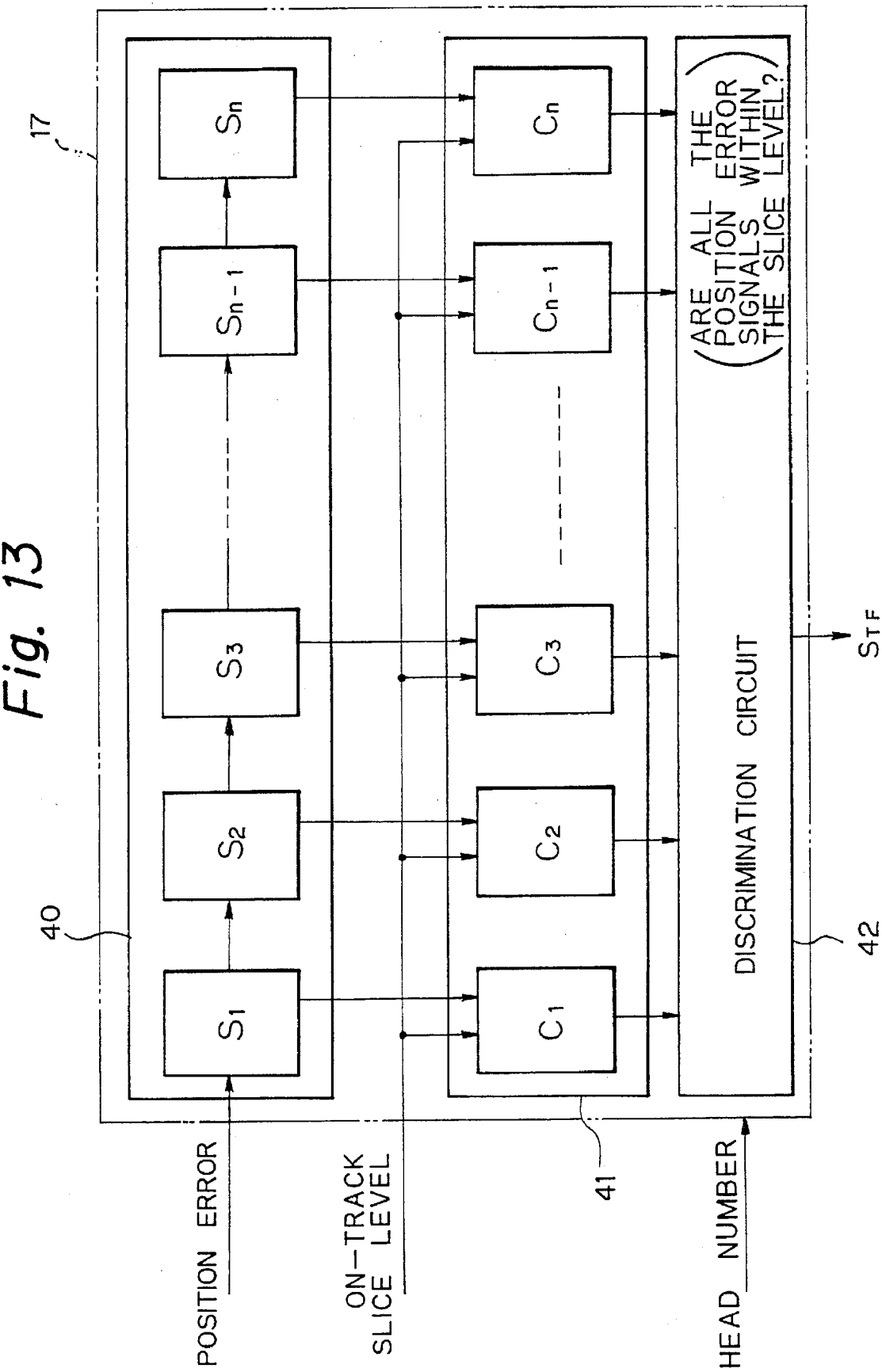

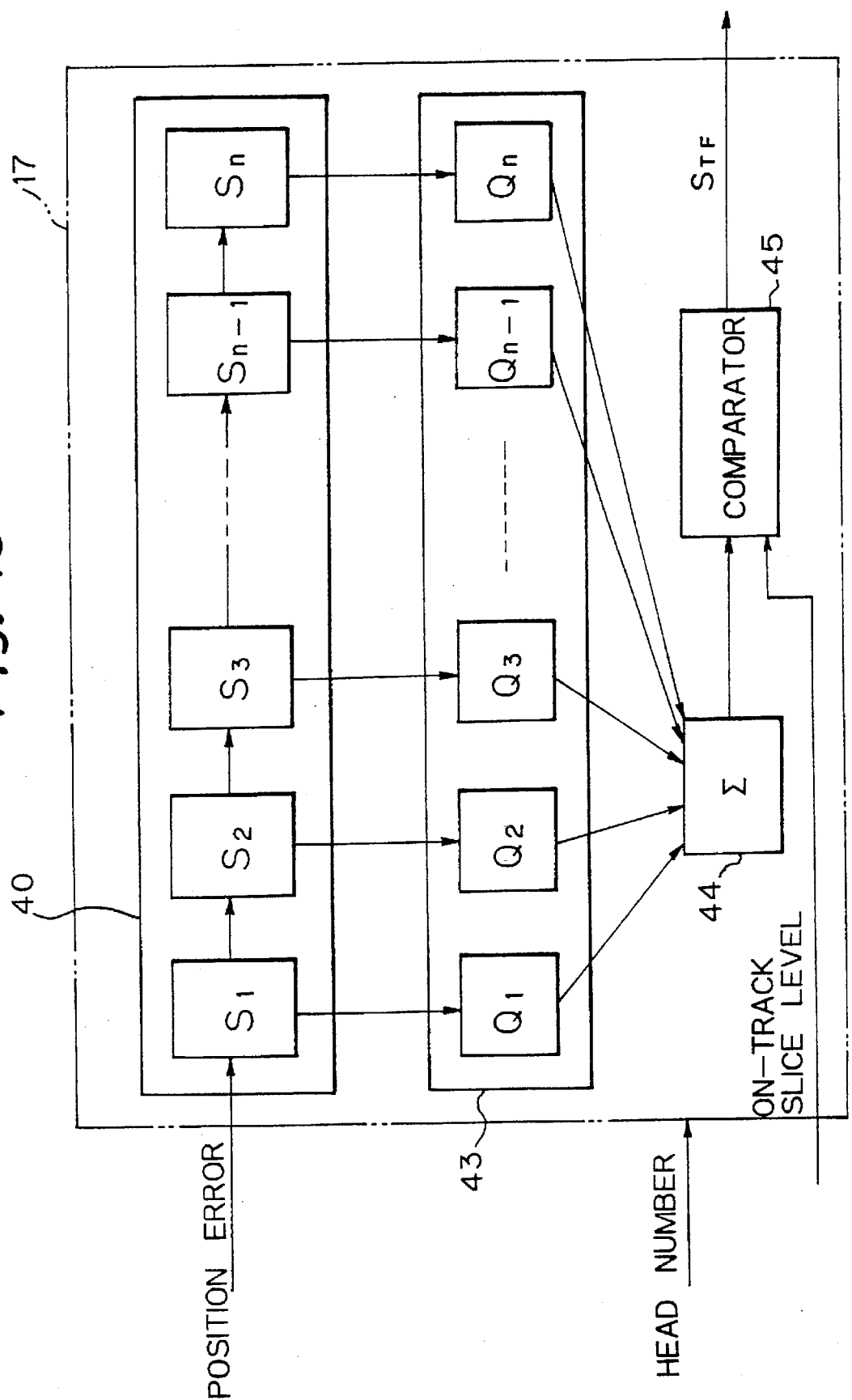

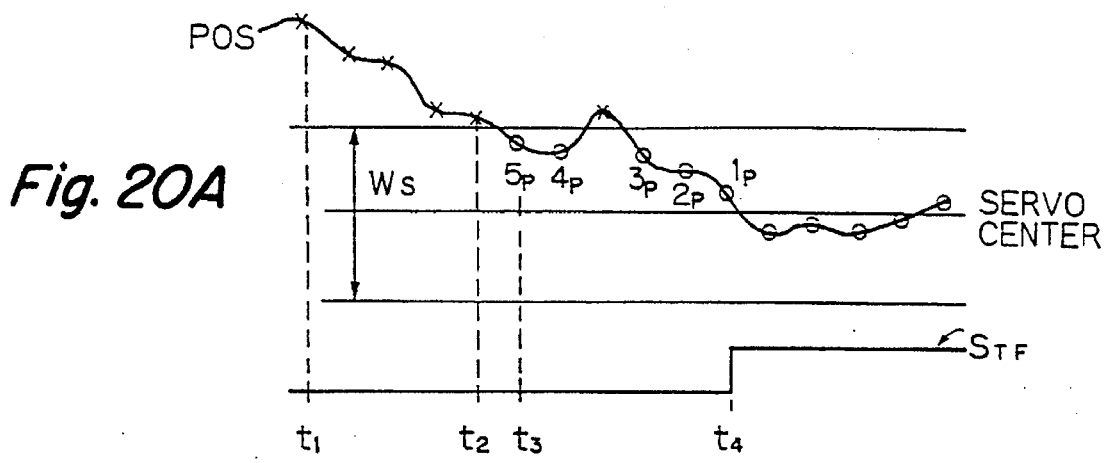
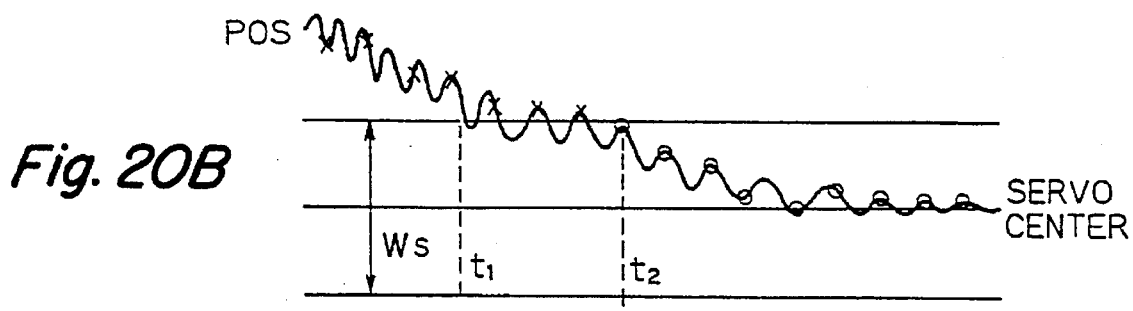
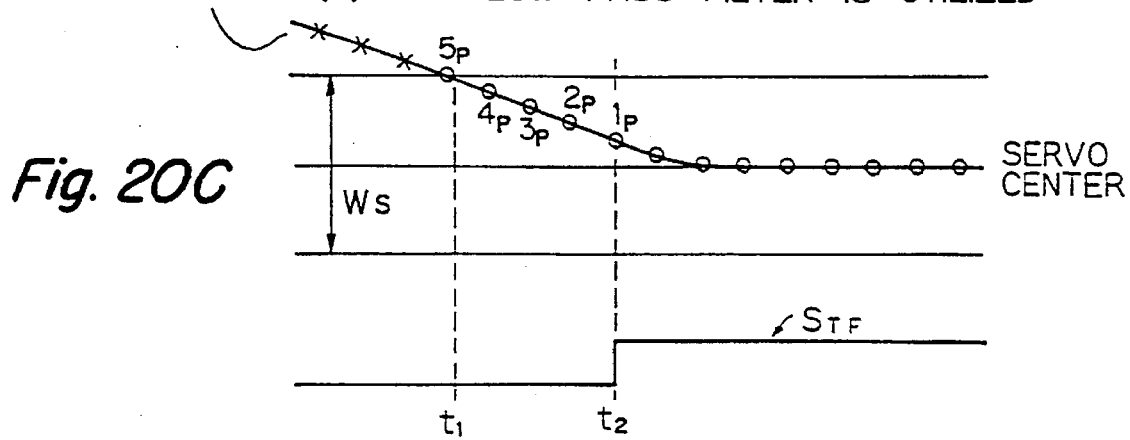

HEAD POSITIONING CONTROL SYSTEM

RELATED APPLICATION

This is a continuation of application Ser. No. 08/026,544, filed on Mar. 4, 1993, now abandoned.

BACKGROUND OF THE INVENTION

1. Field of the Invention

The present invention relates to a head positioning control system which controls at least one head to be positioned on a target position of at least one recording medium such as a disk in at least one magnetic disk unit, optical disk unit or the like.

More specifically, the present invention relates to a head positioning control system which has a function of rapidly discriminating whether or not the head is positioned in the center of a target track of the disk where a track following operation can be performed for reading or writing data from or to the target track, when the target track is designated by a host unit, e.g., a host computer.

2. Description of the Related Art

There is recently a tendency to demand, in a computer system, a transfer of large amounts of data at high speed, and therefore, an auxiliary storage device such as a magnetic disk unit, optical disk unit, or the like, is also required to transfer large amounts of data at high speed to exchange data with the host computer. To meet this requirement, a magnetic disk unit or optical disk unit preferably includes a number of recording media, e.g., a number of disks on which read/write operations of data can be performed substantially simultaneously at high speed by switching the respectively corresponding heads at high speed, and the density of one of recording medium surfaces of a magnetic disk unit or optical disk unit must be increased (a track pitch of not greater than 10 µm, for example).

In contrast, it is difficult to greatly reduce absolute quantities of eccentricity of each disk, deviation between heads, and so forth, which are caused by changes in ambient temperature, etc. In other words, the relative proportions of eccentricity, deviation, and so forth, appears to be increased. As a result, when one head by which a read/write operation has been completed is switched with another head, even though these two heads are located in the track positions of the respective disks in concentric relation with each other, forming of a cylinder (therefore, "track" is sometimes referred to as "cylinder"), the head after switching is likely to go off-track due to the above-mentioned eccentricity, deviation, and so forth.

Therefore, it is necessary to rapidly compensate for an off-track amount by a head positioning control system utilizing a servo control system so as to start performing a read/write operation by means of the head after switching. At this time, in order to confirm a function of the off-track compensation, it is also necessary to rapidly discriminate whether or not the head is positioned in the center of the track of the disk, i.e., whether or not the head is on-track.

Here, to enable the above-mentioned head positioning control system to be understood more clearly, a conventional control system by a servo surface servo system utilizing one surface of a disk as a servo surface will be described with reference to the related drawings of FIGS. 1 to 9, while another conventional control system by a data surface servo system, in which servo data are embedded in advance in all the surfaces of the disks, will be described with reference to the accompanying drawings of FIGS. 10 and 11. In each case, a head positioning control system is applied to a magnetic disk unit, which has a function of discriminating whether or not the head is on-track while the off-track compensation is being carried out.

FIGS. 1 to 9 are diagrams illustrating a conventional example according to a prior art, wherein FIG. 1 is a block diagram of an overall magnetic disk unit, FIG. 2 is a block diagram illustrating a disk mechanism, FIG. 3 is a block diagram of a head positioning servo control unit, FIG. 4 is a block diagram of an on-track discrimination circuit, FIG. 5 is a block diagram of an off-track compensation circuit, FIGS. 6(A) and 6(B) diagrams for explaining an off-track amount, FIG. 7 is a diagram for explaining a part of a process according to a prior art (part 1), FIG. 8 is a diagram for explaining the remaining part of a process according to a prior art (part 2), and FIG. 9 is a flowchart of the on-track discrimination process when the off-track condition is being compensated.

In FIGS. 1 to 9, reference numeral 100 denotes a magnetic disk unit, 200 denotes a host controller, 3 denotes a read/write control unit, 4 denotes a disk mechanism, 5 denotes a head positioning servo control unit, 6 denotes a spindle motor control unit, 7 denotes an off-track compensation unit, 9 denotes a VCM (voice coil motor), 10 denotes arms, 11 denotes a spindle, 12 denotes a servo head, 13 denotes a data head, 14 denotes data surfaces, 15 denotes a servo surface, 16 denotes a magnetic disk, 17 denotes an on-track discrimination circuit, 18 denotes a power amplifier, 19 denotes a speed control/position control switching circuit, 20 to 22 denote comparators, 23 denotes a position signal generating circuit, 24 denotes a velocity signal generating circuit, and reference numeral 25 denotes a servo block control unit.

Moreover, reference numeral 26 denotes a comparator circuit, 27 denotes a counter, 28 denotes a change detecting unit, 29 denotes an AND gate, 30 denotes a comparator circuit, 31 denotes a pulse generating circuit, 33 denotes an analog/digital converter (A/D converter), 34 denotes a work register, 35 denotes an arithmetic unit, 36 denotes an off-track compensation value register, and reference numeral 37 denotes an on-track slice register.

A magnetic disk unit employing a servo surface servo system has heretofore been known, as shown in FIGS. 1 to 5.

In such a magnetic disk unit, the position is not detected by the data head itself but is detected by the servo head only, which is mechanically coupled to the data head.

Therefore, the positions of these heads are deviated relative to each other due to a change in the ambient temperature during operation of the disk unit. Moreover, occurrence of an off-track situation essentially can not be avoided in such a disk unit.

To cope with this disadvantage, there has been proposed an off-track compensation technology which measures and compensates for an amount of the aforementioned deviation.

In order to compensate for the off-track amount, the amount of position deviation between the servo head and the data head is measured, and the data head is positioned so that an offset is generated in a direction cancelling the amount of deviation.

In a disk unit which has a plurality of data heads on an arm, furthermore, the deviation amount and the compensation amount vary depending upon the respective data heads.

That is, the heads must be finely moved, and the off-track compensation must be performed even during head switching operations. The off-track compensation must be frequently carried out because of variance in the off-track amounts among the heads, though high speed access seems to be expected for these switching operations since a seek command is involved in each switching operation.

Hereinafter, a conventional magnetic disk unit employing the above-mentioned servo surface servo system will be described in detail with reference to the above-mentioned drawings.

Referring to FIG. 1, the magnetic disk unit 100 is constituted by the host controller 200, read/write control unit 3, disk mechanism 4, head positioning servo control unit 5, spindle motor control unit 6, off-track compensation unit 7 and the like.

The host controller 200 performs a variety of control operations in the magnetic disk unit 1, exchanges various commands and data from the host unit, and controls the data.

The read/write control unit 3 reads and writes data from and to the disk mechanism 4 in response to an instruction from the host controller 200 and inputs and outputs read/write signals.

Upon receipt of a seek command from the host controller 200, the head positioning servo control unit 5 controls a head positioning operation in the disk mechanism 4.

The off-track compensation unit 7 receives off-track data from the read/write control unit 3 as well as head number and the like, from the host controller 200, and forms data for compensating for the off-track condition.

The spindle motor control unit 6 controls the revolution of a spindle motor in the disk mechanism 4.

The disk mechanism 4 is constituted, for example, as shown in FIG. 2.

In FIG. 2, the disk mechanism 4 is provided with a plurality of magnetic disks 16 which are coupled to a spindle 11 and are rotated by a spindle motor (not shown).

A servo surface 15 is formed on any one of the surfaces of these plurality of magnetic disks 16, and the other surfaces of the magnetic disks 16 are all data surfaces 14. A plurality of magnetic heads are provided on the arms (head arms) 10 that is driven by the VCM (voice coil motor) 9. An actuator is constituted by the arms 10 and the VCM 9.

Among these magnetic heads, the magnetic head on the side of the servo surface 15 is a servo head 12, and all the magnetic heads on the sides of the data surfaces 14 are data heads 13.

The servo head 12 reads servo data on the servo surface 15. The servo data that are read are sent to the head positioning servo control unit 5, and used for controlling the head positioning operation.

The data heads 13 read and write data from and to the data surface 14, and are controlled by the read/write control unit 3.

The VCM 9 is actuated by the head positioning servo control unit 5, and moves the data heads 13 and the servo head 12 in the radial direction of the magnetic disk 16 via the actuator 10.

The head positioning servo control unit 5 is constituted, for example, as shown in FIG. 3.

In FIG. 3, the servo block control unit 25 receives a seek command from the host controller 200, and controls the whole head positioning servo control unit.

The position signal generating circuit 23 demodulates the servo signal read by the servo head 12 and forms a position signal $S_{PO}$.

The velocity signal generating circuit 24 receives the servo signal $S_{SV}$ and forms a velocity signal $S_V$ (actual velocity).

The comparator 21 finds a difference between an off-track compensation data (data from the off-track compensation unit 7) and a target position (instruction value) from the servo block control unit 25, and the comparator 20 finds a difference, i.e., a position error between the above difference of the comparator 21 and the position signal (actual position). The comparator 22 finds a difference, i.e., a velocity error between a target velocity (instruction value) from the servo block control unit 25 and the velocity signal (actual velocity) formed by the velocity signal generating circuit 24.

Upon receipt of a switching signal $S_{SW}$ from the servo block control unit 25, the velocity control/position control switching unit 19 switches the output (position error signal) of the comparator 20 and the output (velocity error signal) of the comparator 22, and sends the operation amount to the power amplifier 18.

The power amplifier 18 drives the VCM 9 depending upon the output that corresponds to the operation amount in order to position the head.

The on-track discrimination circuit 17 inputs the on-track slice level from the off-track compensation unit 7, the head number from the host controller 2, and the output (position error signal) from the comparator 20, and discriminates whether or not the head is on-track.

The on-track discrimination circuit 17 is constituted, for example, as shown in FIG. 4 wherein the comparator circuit 30 compares the on-track slice level with the position error signal, and produces an output of a high level "1" when the position error is within the range of the on-track slice level, and produces an output of a low level "0" (the output is referred to as "on-track signal $S_{ONT}$" that will be described later) when the position error lies outside the range of the on-track slice level.

The pulse generating circuit 31 outputs pulses of a predetermined period, and the AND gate 29 outputs the output pulses of the pulse generating circuit 31 as long as the output of the comparator circuit 30 is at a high level.

The change detecting unit 28 inputs the head number from the host controller 2 and detects a change such as switching of the heads.

The counter 27 counts the pulses output from the AND gates 29, and is reset when the output of the comparator circuit 30 becomes low level "0" or when the change detecting unit 28 has detected a change in the heads (e.g., switching of heads).

The comparator circuit 26 stores a reference value LO for comparison, and compares the counted value output from the counter 27 with the reference value LO (e.g., LO=5).

A track following signal $S_{TF}$ is output when the counted value has exceeded the reference value.

The off-track compensation unit 7 is constituted, for example, as shown in FIG. 5 wherein the analog/digital converter (A/D converter) 33 receives the off-track data from the read/write control unit 3 and converts it into a digital signal.

The arithmetic unit 35 performs a variety of arithmetic processes by using the work register 34 based on the digital off-track data, and outputs an off-track compensation value and an off-track slice level value.

The off-track compensation value register 36 inputs the head number from the host controller 200 and the off-track compensation value, and stores the off-track compensation value that corresponds to the head number.

The on-track slice register 37 inputs the head number from the host controller 200 and the on-track slice level, and stores the on-track slice level that corresponds to the head number.

Here, a track following signal can be exemplified as the signal for indicating a condition for permitting the read and write of data and for starting a track following operation. In a disk unit which does not use the above-mentioned off-track compensation technology, the condition where the track following operation is not carried out does not occur in principle even when the head switching operation is effected (even when a plurality of heads are switched), and therefore an on-track condition need not be discriminated.

When the off-track amount needs to be compensated due to the increase of track density, however, the individual heads are compensated for their off-track condition and are finely moved at the time of a head switching operation. That is, the condition where the track following operation is not carried out takes place, and it becomes necessary to discriminate the aforementioned on-track condition.

Described below in detail is a conventional on-track discrimination process that is carried out while the off-track amount is being compensated.

In the magnetic disk unit of the servo surface servo system as described above, the data head is positioned based on the servo data read by the servo head.

For instance, the data is written by the data head 13 at a data head position that is determined with the servo track as a reference.

Therefore, the off-track amount is determined with the servo track center (center position of the servo track) as a reference.

FIG. 6(A) illustrates a case where the off-track amount is larger than the on-track slice level, and FIG. 6(B) illustrates a case where the off-track amount is smaller than the on-track slice level.

FIG. 6(A) illustrates a case where the servo head 12 has an on-track slice level of Ws, the head #1 (data head) exists at a position of an off-track amount "a" from the servo track center which is the center of the servo head 12, and the head #2 (data head) exists at a position of an off-track amount "b"

In this case, the off-track amounts "a" and "b" are greater than the on-track slice level Ws of the servo head 12.

FIG. 6(B) illustrates a case where the head #1 exists at a position of an off-track amount "c" from the servo track center and the head 2 exists at a position an off-track amount "d". In this case, the off-track amounts c and d are smaller than the on-track slice level Ws.

Described below are methods of discriminating the on-track condition while the off-track amount is being compensated.

(EXAMPLE 1) - - - see FIG. 7

This is the case where the two data head 13 (head #1, head #2) having off-track amounts a, b shown in FIG. 6(A) are switched.

In FIG. 7, ① illustrates a head #1 select signal, ② denotes a head #2 select signal, ③ illustrates the servo track center, ④ illustrates an on-track signal (output signal of the comparator circuit 30 of FIG. 4), ⑤ illustrates a track following signal (output signal of the comparator circuit 26 of FIG. 4), and symbol POS denotes a position signal of the servo head.

Moreover, symbol Wa denotes an on-track slice level of the head #1, Wb denotes an on-track slice level of the head #2, symbols $HS_1$ and $HS_2$ denote timings for switching the heads, Ts denotes a settling time, and symbols "-a" and "-b" denote off-track amounts represented by adding signs (see FIG. 6(A)).

It is now presumed that the head #1 is selected at a time $t_1$ by the select signal of ①. The timing $HS_1$ for switching the heads is detected by the change detecting unit 28 (detected by the head number) of FIG. 4, and the counter 27 is reset.

During a period of from time $t_1$ to time $t_2$, the position signal POS lies outside the range of Wa, and the on-track signal of ④ is at low level "0". Therefore, the counter 27 does not start counting.

When the position signal POS enters the range Wa at the time $t_2$, the on-track signal becomes high level "1", and the AND gate 29 outputs a pulse which is then counted by the counter 27.

At a time $t_3$ when the pulses 1p to 5p are counted, the track following signal of ⑤ becomes high level "1".

Then, when the head #2 is selected by the select signal of ② at a time $t_4$, the counter 27 is reset in the same manner as described above.

During a period from time $t_4$ to time $t_5$, the position signal POS lies outside the range Wb, the in-slice signal of ④ is at low level "0", and the counter 27 does not start counting.

As a time $t_5$, the position signal POS enters the range Wb, whereby the AND gate 29 outputs a pulse, and the counter 27 starts counting.

When the pulses 1p through up to 5p are counted at a time $t_6$, the on-track signal of ⑤ assumes "1", and it is discriminated that the on-track condition is established.

In the above-mentioned case, the periods $t_2$ to $t_3$ and $t_5$ to $t_6$ are settling times Ts until the on-track condition is stabilized.

(EXAMPLE 2) - - - see FIG. 8

This is the case where the two data heads (head #1, head #2) having off-track amounts c, d shown in FIG. 6B are switched.

In FIG. 8, ① to ⑤, POS, $HS_1$, and Ts have the same meaning as those of FIG. 7. In this case, the off-track amount of the head #1 is "-c" and the off-track amount of the head #2 is "-d", which are both smaller than the on-track slice level.

The on-track slice level of the head #1 is denoted by Wc, and the on-track slice level of the head #2 is denoted by Wd.

When the off-track amount is small and the position signal POS is already entering the range Wd at a time $t_1$ when the head #1 is selected as in this case, the counter 27 starts the counting operation just at the head switching timing $HS_1$.

When the counter 27 counts the pulses 1p up to 5p at a time $t_2$, the signal of 4 assumes high level "1", and it is discriminated that the on-track condition is established.

Even in this case, the period Ts starting from the head switching timing $HS_1$ (from time $t_1$ to time $t_2$) serves as a settling time Ts.

Described below with reference to FIG. 9 is the on-track discrimination process when the off-track amount is being compensated. The respective process numbers FIG. 9 are given in parentheses.

First, when the data head 13 is switched (S1), the head positioning servo control unit 5 reads the offset amount (off-track amount) of the switched head from a table (off-track compensation value register 36) of the off-track compensation unit 7, and starts a seek operation in a direction cancelling this offset amount (S2).

Next, the head positioning servo control unit 5 reads the on-track slice data from the on-track slice register 37 in the off-track compensation unit 7, and sets the range of on-track slice to a value that corresponds to the off-track amount of the head (S3).

The above range of the on-track slice is set to the comparator circuit 30 in the on-track discrimination circuit 17.

In the on-track discrimination circuit 17, the counter 27 is reset (Count←0) by the change detecting unit 28 (S4), and the comparator circuit 30 checks whether or not the position signal POS is within the on-track slice (S5).

If it does not lie within the on-track slice, the track following signal $S_{TF}$ output from the comparator circuit 26 is rendered to assume low level "0" (S7), and the above process S4 and S5 are repeated.

Thereafter, when the position signal POS enters the on-track slice (S5), the counter 27 counts the pulses output from the pulse generating circuit 31 (Count←Count+1) (S6).

The counted value is compared by the comparator circuit 26 with a constant LO (a constant which determines a settling condition and is, for example, LO=5) which is stored therein (S8).

When the counted value (Count) of the counter 27 is smaller than the constant LO (Count≦LO) as a result of comparison, the procedure returns to the process S5 and when the counted value becomes greater than the constant LO (Count>LO), the track following signal $S_{TF}$ is rendered to assume high level "1" (S9), and the comparator circuit 26 outputs a track following signal.

However, a conventional head positioning control system utilizing a servo surface servo system as described above has the following problems.

First, in the control system, an off-track compensation is always carried out when a certain head is switched to another head. Therefore, the non-track following condition (e.g., the condition between the time $t_1$ to $t_3$ and between the time $t_4$ to $t_6$ in FIG. 7, or the condition between the time $t_1$ to $t_2$ in FIG. 8), where a track following operation is not carried out, takes place during the switching operation of the heads, even when it is not necessary to set the switched head to such a non-track following condition.

Particularly, in the case shown in FIG. 8, the settling time $T_S$ is provided in any case, even though the off-set amount of the switched head is smaller than the on-track slice level and hence it is apparently unnecessary to set the switched head to such a non-track following condition. Consequently, the on-track discrimination process becomes relatively slow when the off-track compensation is performed, in the case where data is read from or written to a plurality of disks by means of the switching operations of the corresponding heads.

Second, since the on-track discrimination process is not carried out rapidly, it becomes difficult for the read/write operations to be performed at high speed. As a result, the performance of a head positioning control system as a whole is likely to be deteriorated.

On the other hand, another conventional head positioning control system utilizing a data surface servo system as shown in FIGS. 10 and 11 will be described briefly for reference.

The constructions of FIGS. 10 and 11 are similar to FIGS. 1 and 2, respectively, except that a servo surface and the corresponding servo head are not provided FIGS. 11 and a flow of signals in FIGS. 10 and 11 is partially different from that in FIG. 2.

To be more specific, in the control system utilizing a data surface servo system shown in FIGS. 10 and 11, specified servo data are embedded in advance in all the tracks of each disk and the off-track amount is determined by the servo data of each respective disk. Namely, the servo data of each respective disk are read out by the data head 13 together with the normal data and are sent to a read/write control unit 3 as R/W signals. Further, the servo data input to the read/write control unit 3 is extracted from the normal data, and is sent to the head positioning servo control unit 5 as a servo signal $S_{SV}$. Further, the off-track amount is calculated by the head positioning servo control unit 5, and the off-track compensation is performed in accordance with the calculated off-track value.

Also in such a control system utilizing a data surface servo system, the same problems occur as those described in the control system utilizing a servo surface servo system.

SUMMARY OF THE INVENTION

In view of the these problems, the main object of the present invention is to provide a head positioning control system for controlling at least one head to be positioned on a target position of at least one recording medium, which enables read/write operations of large amounts of data to be performed at high speed.

A further object of the present invention is to provide a head positioning control system which is capable of rapidly discriminating whether or not the head is on-track where a track following operation can be performed, when the target track is selected by a host unit.

A still further object of the present invention is to provide a head positioning control system which is capable of rapidly discriminating whether or not the head is on-track when the off-track compensation is performed, in the case where data is read from or written to a plurality of disks by means of the switching operations of the corresponding heads.

A still further object of the present invention is to provide a head positioning control system which can be applied to a magnetic disk unit utilizing a servo surface servo system.

A still further object of the present invention is to provide a head positioning control system which can be applied to a magnetic disk unit utilizing a data surface servo system.

To attain the above objects, the head positioning control system according to the present invention comprises at least one head for reading and writing data from and to at least one recording medium; head positioning means for positioning the head to a target position on the recording medium; and head positioning control means for controlling the head positioning means. Further, the head positioning control means is operative to discriminate whether or not the head is positioned approximately in the center of the target position by evaluating position information retroactively in comparison to the past position thereof, when a position error between the current position of the head and the target position thereof is compensated in the case where the target position is designated.

Preferably, in the control system, the head positioning control means is operative to determine that the head is positioned approximately in the center of the target position, when sampling data of a plurality of consecutive position errors are all within the range of a predetermined value.

Further, preferably, the head positioning control means is operative to determine that the head is positioned approximately in the center of the target position, when m (m<n)

sampling data excluding some sampling data, among n sampling data of a plurality of consecutive position errors, are within the range of a predetermined value.

Further, preferably, the control system which is applied to a magnetic disk unit utilizing a servo surface servo system, comprises a plurality of disks in which any one surface thereof is a servo surface and the other surfaces thereof are data surfaces; a servo head arranged on the side of the servo surface; a plurality of data heads arranged on the side of the data surfaces respectively; a positioning mechanism for positioning the servo head and the plurality of data heads to a target tracks on the plurality of disks respectively; and a control unit for controlling the positioning mechanism, by reading servo information on the data surfaces, to calculate off-track compensation data based on the servo information and to update the off-track compensation data. Further, the control unit is operative to use an on-track slice level determined by the off-track amount of the newly selected data head when a certain data head is switched to the newly selected data head and to discriminate whether or not the newly data head is on-track by evaluating position signals of the servo head including the position signal just after the certain data head is switched to the newly selected data head, retroactively in comparison to the past position signals.

Further, preferably, the control unit utilizing a servo surface servo system is operative to determine that the newly selected data head is on-track, when sampling data of a plurality of consecutive position errors obtained from the position signals are all within the range of the on-track slice level.

Further, preferably, the control unit utilizing a servo surface servo system is operative to determine that the newly selected data head is on-track, when m (m<n) sampling data excluding some sampling data, among n sampling data of a plurality of consecutive position errors obtained from the position signals, are within the range of a predetermined value.

Further, preferably, the control unit utilizing a servo surface servo system is operative to regard a locus of the position signals obtained retroactively in comparison to the past as time-series data and to process the time-series data by means of a low pass filter, and to determine that the newly selected data head is on-track by evaluating the processed position signals.

Alternatively, the control system is also applied to a magnetic disk unit utilizing a data surface servo system.

BRIEF DESCRIPTION OF THE DRAWINGS

The above object and features of the present invention will be more apparent from the following description of the preferred embodiments with reference to the accompanying drawing, wherein:

FIGS. 6(A) and 6(B) are diagrams for explaining an off-track amount related to a prior art utilizing a servo surface servo system;

FIG. 13 is a block diagram showing an on-track discrimination circuit of one concrete embodiment according to the present invention utilizing a servo surface servo system;

FIG. 19 is a block diagram showing an on-track discrimination circuit of still another concrete embodiment according to the present invention;

FIG. 20(A)-(C) are timing charts for explaining an on-track discrimination process related to FIGS. 18 and FIG. 19;

DESCRIPTION OF THE PREFERRED EMBODIMENTS

Figure 12A:
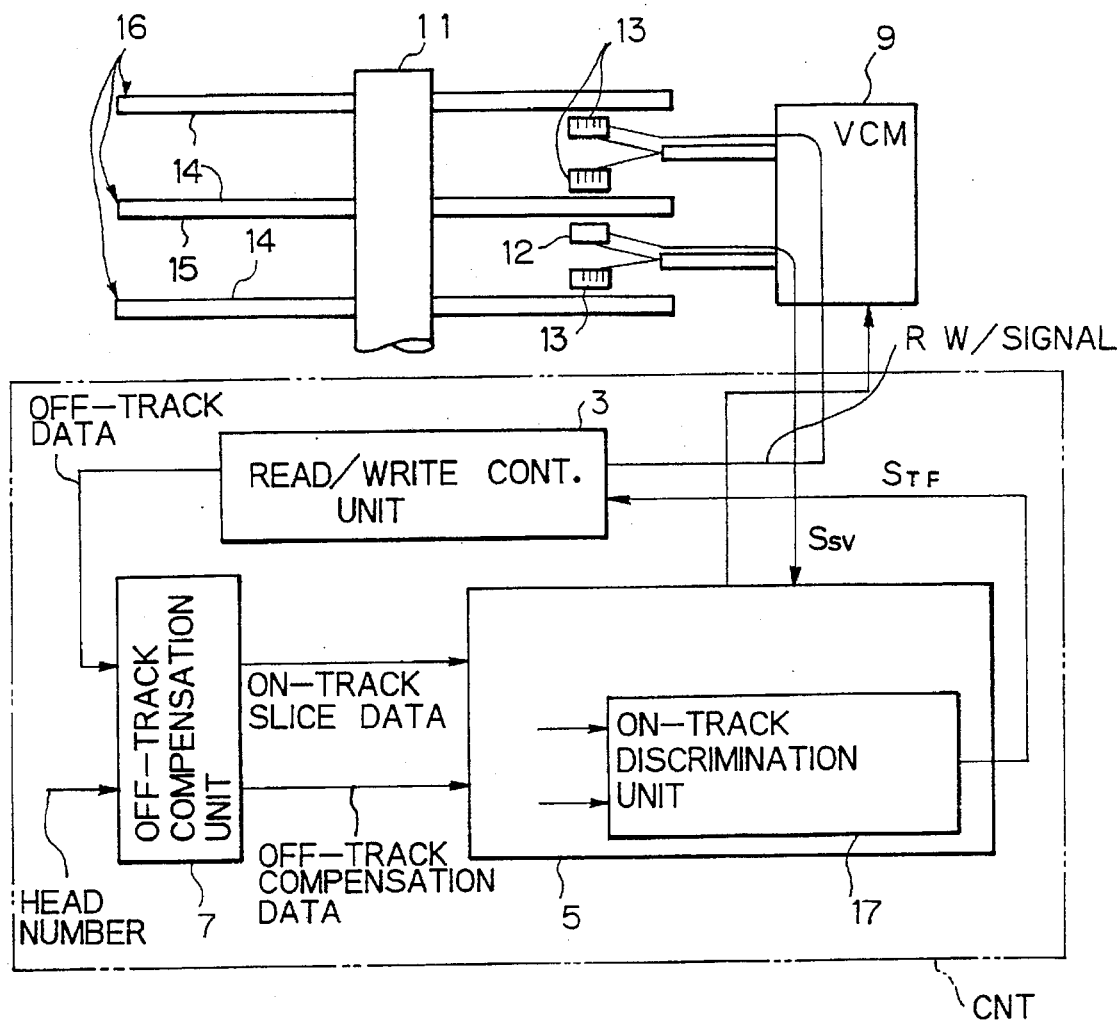
FIGS. 12(A) and 12(B) are diagrams showing an essential embodiment based on the principle of the present invention utilizing a servo surface servo system.
Figure 12B:
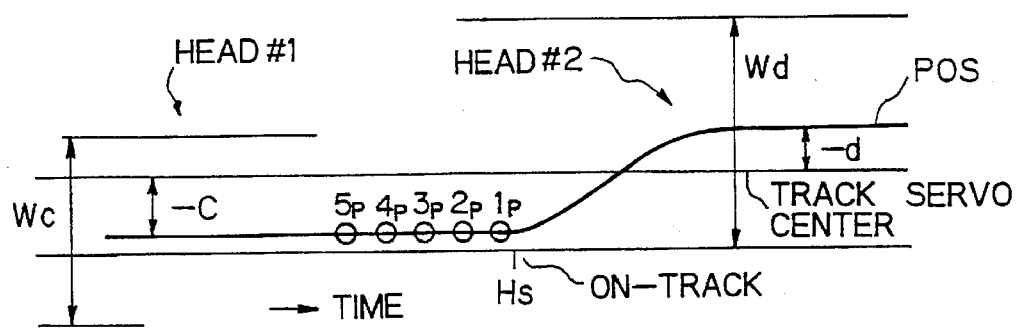

FIGS. 12(A) and 12(B) are diagrams showing an essential embodiment based on the principle of the present invention. Hereinafter, any component that is the same as that mentioned before will be referred to using the same reference number. To be more specific, FIG. 12(A) is a diagram illustrating the constitution of a disk unit utilizing a servo surface servo system and FIG. 12(B) is a diagram for explaining the on-track discrimination process.

In order to solve the aforementioned problems, the embodiment of FIGS. 12(A) is constituted as described below.

The head positioning control system comprises:

a plurality of disks 16 wherein any one surface is a servo surface 15 and the other surfaces are all data surfaces 14;

a servo head 12 arranged on the side of the servo surface;

a plurality of data heads 13 arranged on the side of the data surfaces;

a positioning mechanism (VCM) 9 for positioning the servo head and the data heads at desired tracks; and a control unit CNT for controlling the positioning mechanism 9;

wherein the control unit CNT reads servo data on the data surfaces, calculates off-track compensation data, and updates it.

Further, the on-track is discriminated at the time of compensating for the off-track amount of a disk unit that controls the head positioning operation by using the servo data and the off-track compensation data.

Further, when the data heads 13 are switched, the control unit CNT discriminates the on-track condition by evaluating position signals POS of the servo head 12 retractively to the past inclusive of the past just after the data heads are switched, by using an on-track slice level Wd that is determined with an off-track amount "–d" of a newly selected head as a reference.

In such a constitution, in evaluating the position signals POS, it is discriminated that the on-track condition is established when sample data of a plurality (n) of consecutive position errors are all within a range of the on-track slice level Wd.

In evaluating the position signals POS, it is discriminated that the on-track condition is established when sample data (m, m<n) of a plurality (n) of consecutive position errors, except some sample data, are all within a range of the on-track slice level Wd.

Further, in these constitutions, in evaluating the position signals POS, the locus of position signals retractively to the past is regarded as time-series data and is processed through a low-pass filter, and the position signals processed through the low pass filter are evaluated.

The operation of the embodiment based on the above-mentioned constitution will now be described with reference to FIGS. 12(A) and 12(B).

The off-track compensation unit 7 inputs off-track data from the read/write control unit 3 and the head number from the host controller, and forms an off-track compensation data and an on-track slice level.

The head positioning servo control unit 5 inputs a servo signal $S_{SV}$ read by the servo head 12 and the off-track compensation data from the off-track compensation unit 7, and controls the head positioning operation according to instructions from the host controller.

At this moment, furthermore, the on-track discrimination circuit 17 in the head positioning servo control unit 5 inputs the on-track slice level from the off-track compensation unit 7, further inputs a position error signal formed inside thereof, executes the on-track discrimination process, and outputs a track following signal $S_{TF}$.

The track following signal $S_{TF}$ is sent to the read/write control unit 3 and is used as a condition for permitting the data to be read or written by the data head 13.

The on-track discrimination process is carried out by the on-track discrimination circuit 17, as described above.

In FIG. 12(B), for instance, the head #1 and the head #2 (data heads) are switched, wherein the head #1 has an off-track amount of "–c" and an on-track slice level of Wc, and the head #2 has an off-track amount of "–d" and an on-track slice level of Wd.

It is now presumed that the head #1 that is being selected is switched to the head #2. The timing for switching the head is denoted by Hs.

In this case, the on-track slice level Wd of the newly selected head #2 contains the past position signals POS (circles of 1p, 2p, 3p, 4p and 5p in FIG. 12(B)) of before Hs.

At the same time when the head #1 is switched to the head #2, therefore, it is discriminated that the on-track condition is established (the on-track signal assumes high level "1").

When the off-track amount is smaller than the on-track slice level as described above, it is discriminated that the on-track condition is established simultaneously with the switching of the head.

When the off-track amount is greater than the on-track slice level, furthermore, the time for discrimination increases depending upon the off-track amount. As a whole, however, the time for discriminating the on-track condition is shortened.

The concrete embodiments of the present invention will now be described in conjunction with the drawings.

Figure 14:
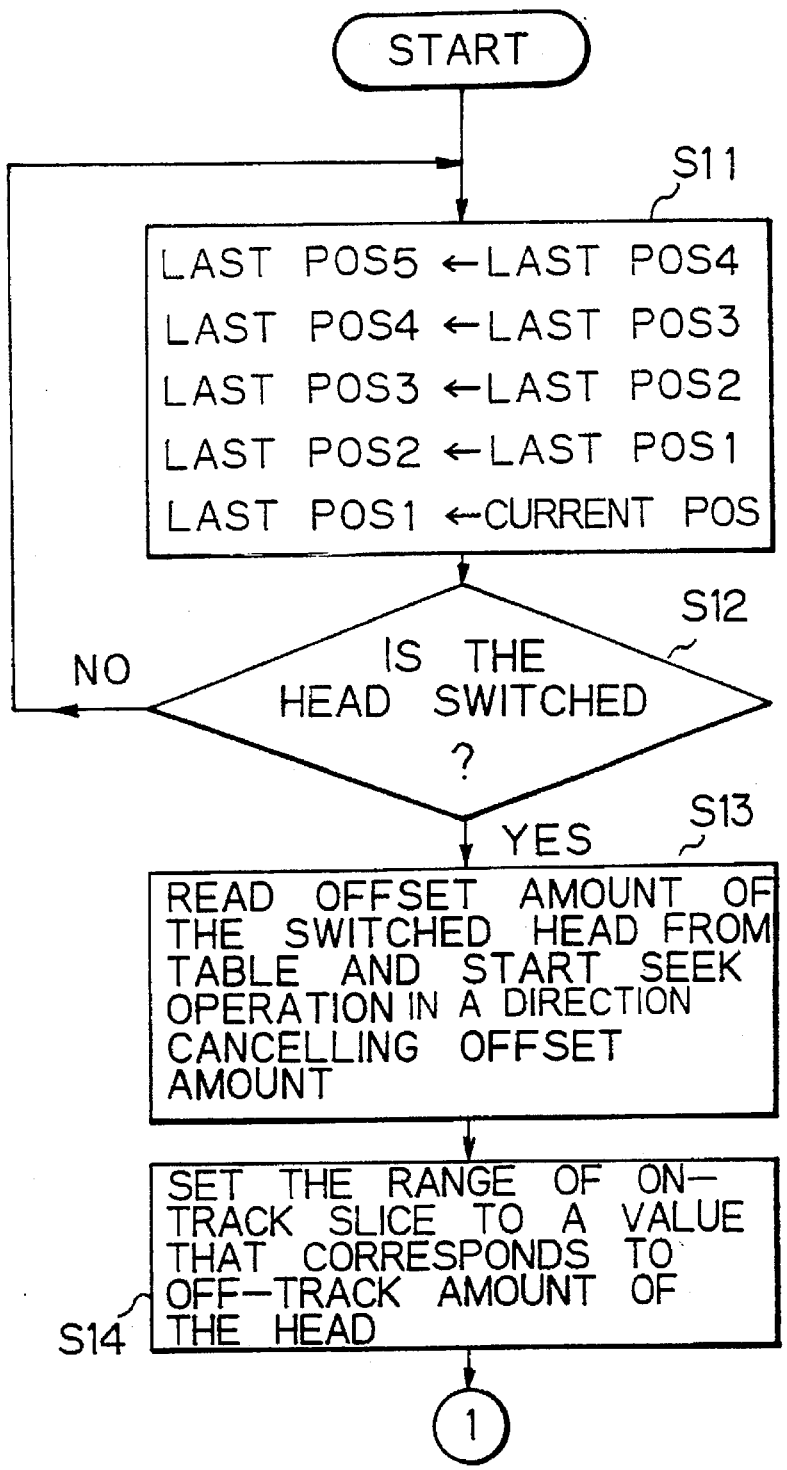
FIGS. 14 and 15 is a flowchart for explaining an on-track discrimination process of one concrete embodiment according to the present invention utilizing a servo surface servo system.
Figure 15:
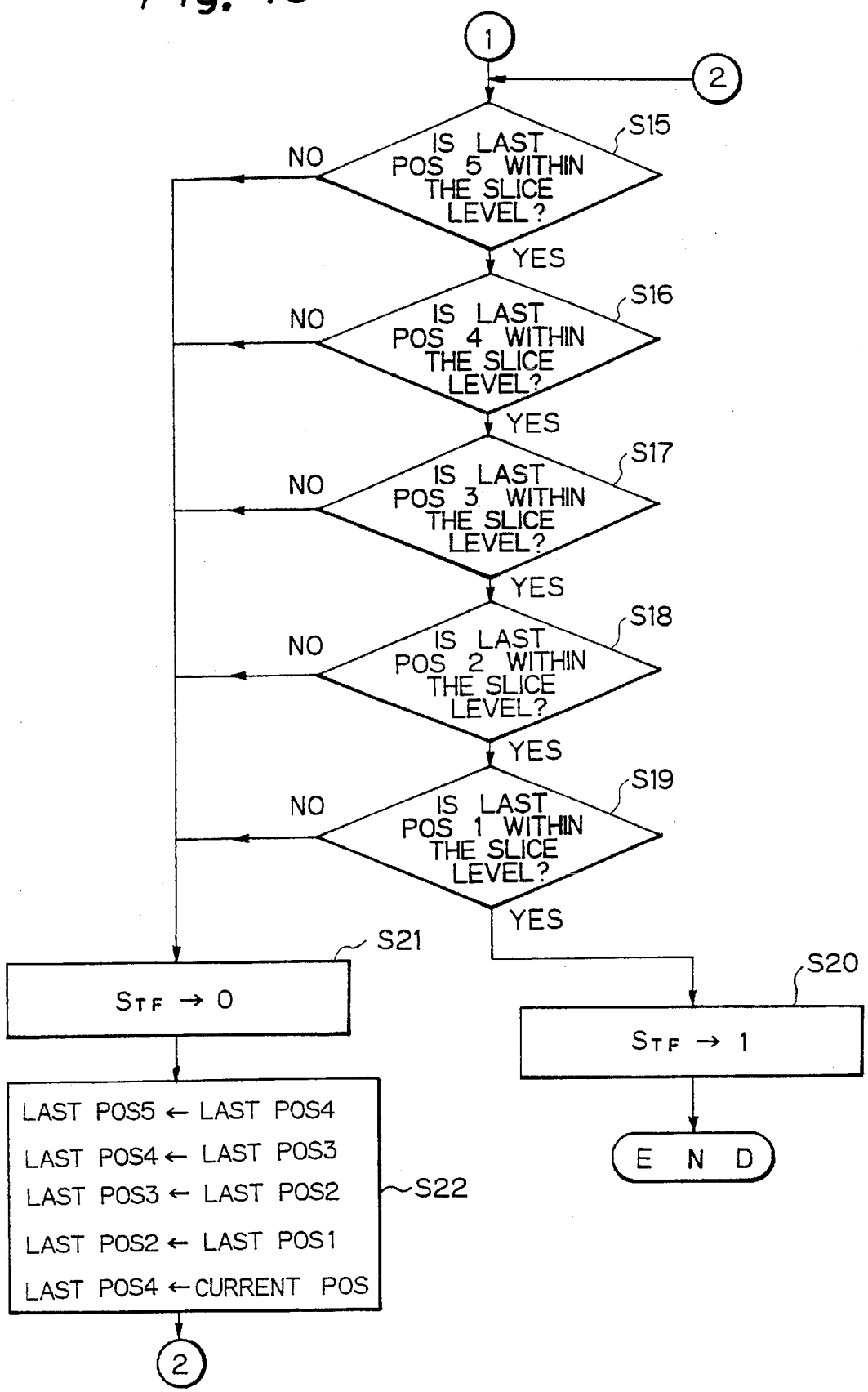
Figure 16:
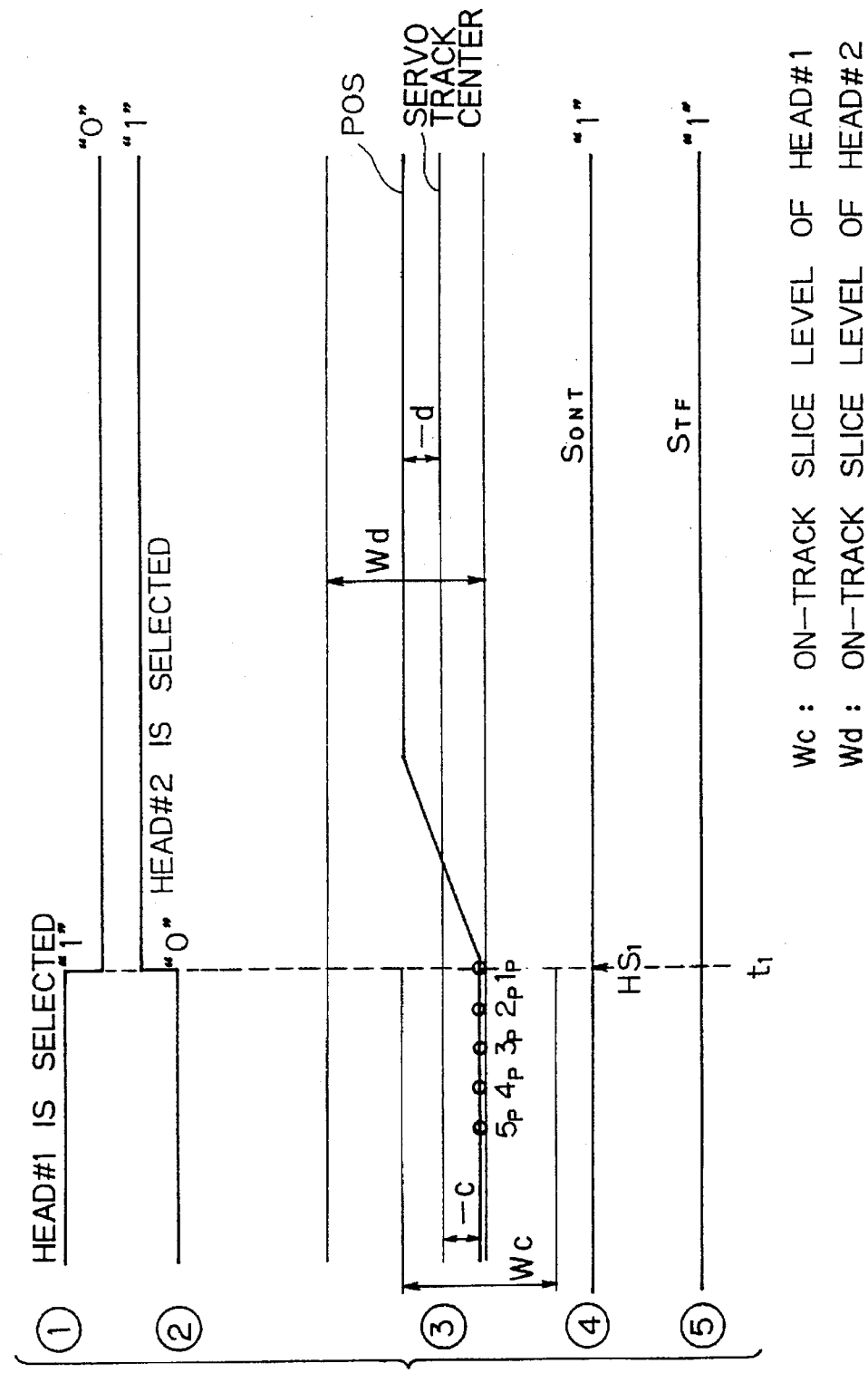
FIG. 16 is a timing chart for explaining a process of one concrete embodiment utilizing a servo surface servo system in the case where an off-track amount is small.
Figure 17:
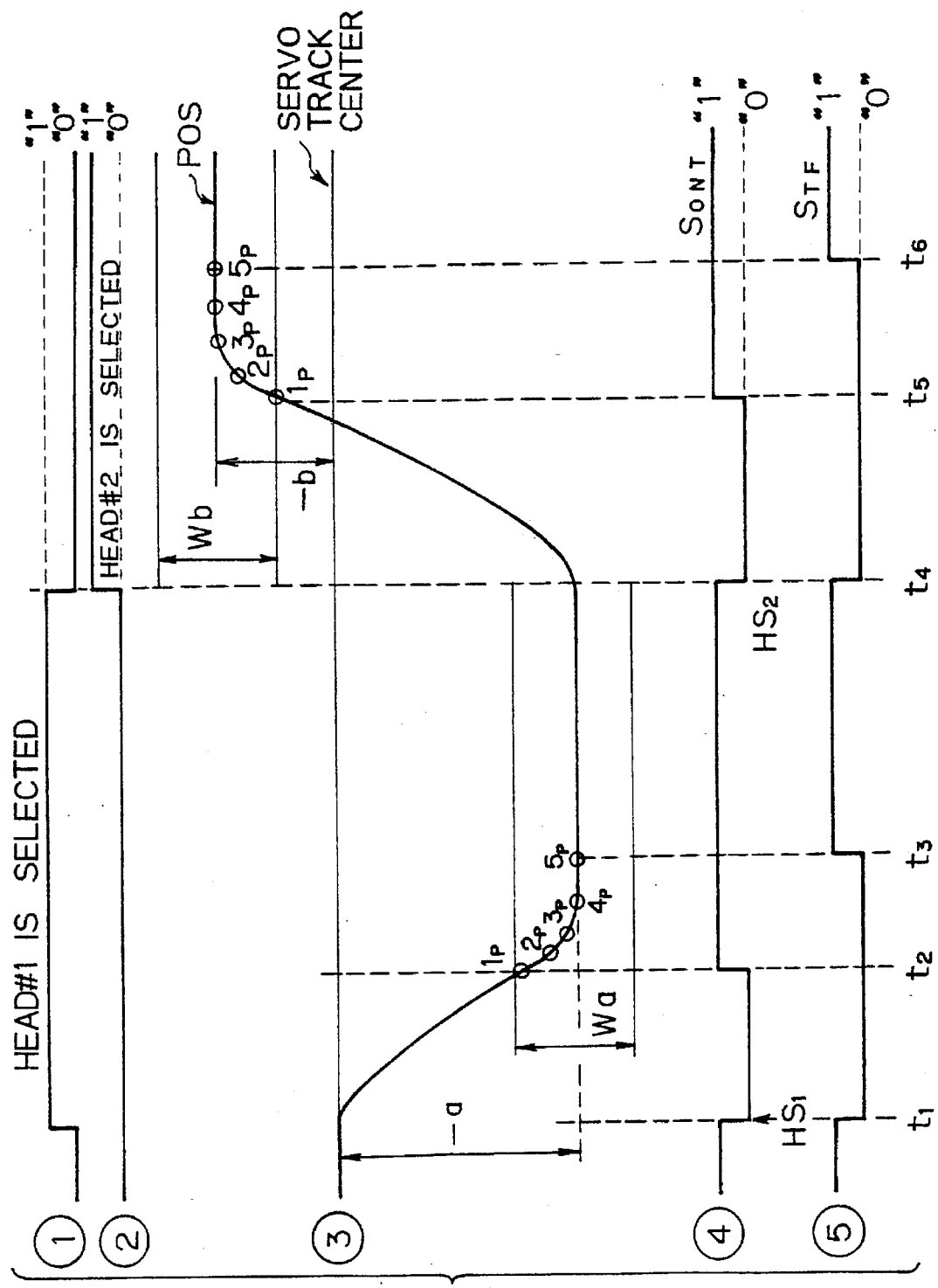
FIG. 17 is a timing chart for explaining a process of one concrete embodiment utilizing a servo surface servo system in the case where an off-track amount is large.

FIGS. 13 to 17 are diagrams illustrating one concrete embodiment of the present invention, wherein FIG. 13 is a block diagram of the on-track discrimination circuit, FIG. 14 is part of a flowchart (part 1) of the on-track discrimination process, FIG. 15 is the remaining part of a flow chart (part 2) of the on-track discrimination process, FIG. 16 is a diagram (related to FIG. 8) for explaining the process, and FIG. 17 is a diagram (related to FIG. 7) for explaining the process.

In FIGS. 13 to 17, the same portions as those of FIGS. 1 to 12(B) are denoted by the same reference numerals. Moreover, reference numeral 40 denotes a shift register, 41 denotes a comparator, and 42 denotes a discrimination circuit.

The above-mentioned concrete embodiment deals with a magnetic disk unit employing a servo surface servo system like the aforementioned prior art.

The magnetic disk unit is constituted in the same manner as the aforementioned prior art (the same constituent portions as those of the prior art are not described) except that the on-track discrimination circuit 17 is constituted as shown in FIG. 13.

The on-track discrimination circuit 17 used in the embodiment is constituted, as shown in FIG. 13, by the shift register 40, comparator 41, and discrimination circuit 42.

The shift register 40 is constituted by n digits of shift register units $S_1$ to $S_n$, and the comparator 41 is constituted by n comparator units $C_1$ to $C_n$.

The shift register 40 is so constituted as to input position error signals (sampling data) and to shift the signals in the order of $S_i \rightarrow S_2 \rightarrow - - - \rightarrow S_3 \rightarrow S_{n-1} \rightarrow S_n$.

The comparator units $C_1$ to $C_n$ in the comparator 41 input the data from the shift register units $S_1$ to $S_n$ in the shift register 40 as well as the on-track slice level from an external unit, and compare them together (as to whether or not the position errors are within the on-track slice level).

The discrimination circuit 42 inputs the results of comparison of the comparator 41, discriminates whether or not the position error signals are all within the on-track slice level, and produces an on-track signal of high level "1" when the position error signals are all within the on-track slice level, and produces an on-track signal of low level "0" in other cases.

The data of the shift register 40 are shifted, for example, as described below.

(1) The on-track discrimination circuit 17 is provided with a pulse generator, and the data are shifted in synchronism with the pulses generated by the pulse generator.

(2) The on-track discrimination circuit 17 is provided with a timer (e.g., an interval timer), and the data are shifted in synchronism with the output of the timer.

(3) When the position error signals are to be found by sampling, the data are shifted in synchronism with, for example, a sampling period.

In such an on-track discrimination circuit 17, the discrimination circuit 42 may input a head number, detect a head switching timing, and render the discrimination at this timing, or may render the discrimination at all times without using head number.

Next, described below with reference to flowcharts of FIGS. 14 and 15 is the on-track discrimination process at the time when the off-track amount is being compensated. The process numbers of FIGS. 14 and 15 are given in parentheses.

In the following description, the on-track discrimination circuit 17 employs a comparator 41 which consists of five digits of shift registers ($S_1$ to $S_5$) and five comparator units $C_1$ to $C_5$ (In FIG. 13, $C_n$ is set to $C_5$).

In FIGS. 14 and 15, furthermore, Last Pos 1 to Last Pos 5 denote values of position signals (position error signals) of 1 sample before through up to 5 samples before, and Current Pos denotes a value of the present position signal (position error signal value right after the head is switched).

That is, Last Pos 1 is set in the digit $S_1$ of the shift register 40, Last Pos 2 is set in the digit $S_2$, Last Pos 3 is set in the digit $S_3$, Last Pos 4 is set in the digit $S_4$, and Last Pos 5 is set in the digit $S_5$.

Further, the Current Pos which is the present value right after the head is switched is set in the digit $S_1$ of the shift register 40. At this moment, the data of the digits $S_1$ to $S_5$ are shifted in the order of $S_1 \rightarrow S_2 \rightarrow S_3 \rightarrow S_4 \rightarrow S_5$, and the data of the digit $S_5$ is deleted.

When the process is started, a position error signal from an external unit is, first, set in the shift register 40.

In the shift register 40, in this case, the position error signal is shifted in the order mentioned above, i.e., Last Pos 4 is shifted to Last Pos 5, Last Pos 3 is 5 shifted to Last Pos 4, Last Pos 2 is shifted to Last Pos 3, Last Pos 1 is shifted to Last Pos 2, and Current Pos which is the present value is set in the digit $S_1$ (S11).

This process is repeated. Then, when the head is switched (S12), the head positioning servo control unit 5 reads the offset amount of the switched head from the table (off-track compensation value register 36) in the off-track compensation unit 7, and the seek operation is started in a direction cancelling this offset amount (S13).

Next, the head positioning servo control unit 5 reads the on-track slice data from the on-track slice register 37 in the off-track compensation unit 7, and sets the range of on-track slice to a value that corresponds to the off-track amount of the head (S14).

Thereafter, the comparison is carried out by the comparator units $C_1$ to $C_5$ in the comparator 41 of the on-track discrimination circuit 17.

In this comparison process, the values of Last Pos 1 to Last Pos 5 set in the shift registers ($S_1$ to $S_5$) 40 are compared as to whether they are within the on-track slice level or not, and the results are discriminated by the discrimination circuit 42 (S15 to S19).

When the result of discrimination indicates that the Last Pos 1 to Last Pos 5 are all within the on-slice level, the track following signal is made high level "1" (S20). In other cases, the above-mentioned comparison process and the discrimination process are repeated while updating the data in the on-track discrimination circuit 17.

That is, when Last Pos 1 to Last Pos 5 are all lying outside the on-track slice level, the on-track signal is made low level "0" (S21), the data in the shift register 40 are shifted (S22), and the aforementioned processes (S15 to S19) are repeated.

In the above-mentioned process, the data of the on-track slice level is data that is based on the off-track value of the head that is newly selected after the head is switched.

In the above process, furthermore, the discrimination process is carried out by the 10 discrimination circuit 42 at a moment when the head is switched. The discrimination process, however, may be carried out at all times irrespective of the switching of the head.

The on-track discrimination process will now be described with reference to FIGS. 16 and 17.

FIG. 16 is a timing chart for explaining one example of a process according to the concrete embodiment in FIGS. 13 to 15.

Figure 8:
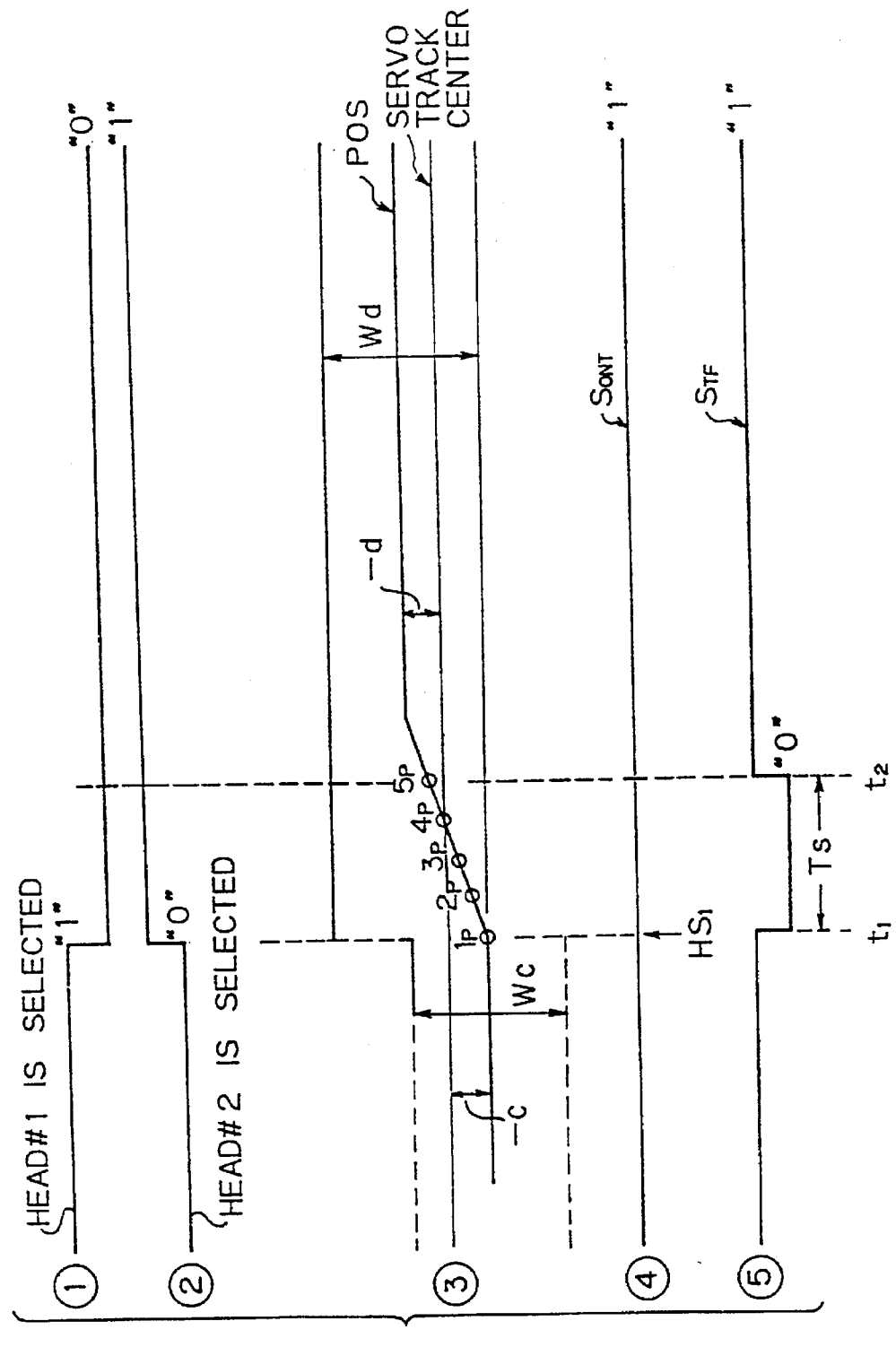
FIGS. 8 is a timing chart for explaining another process of 6(B)
Figure 9:
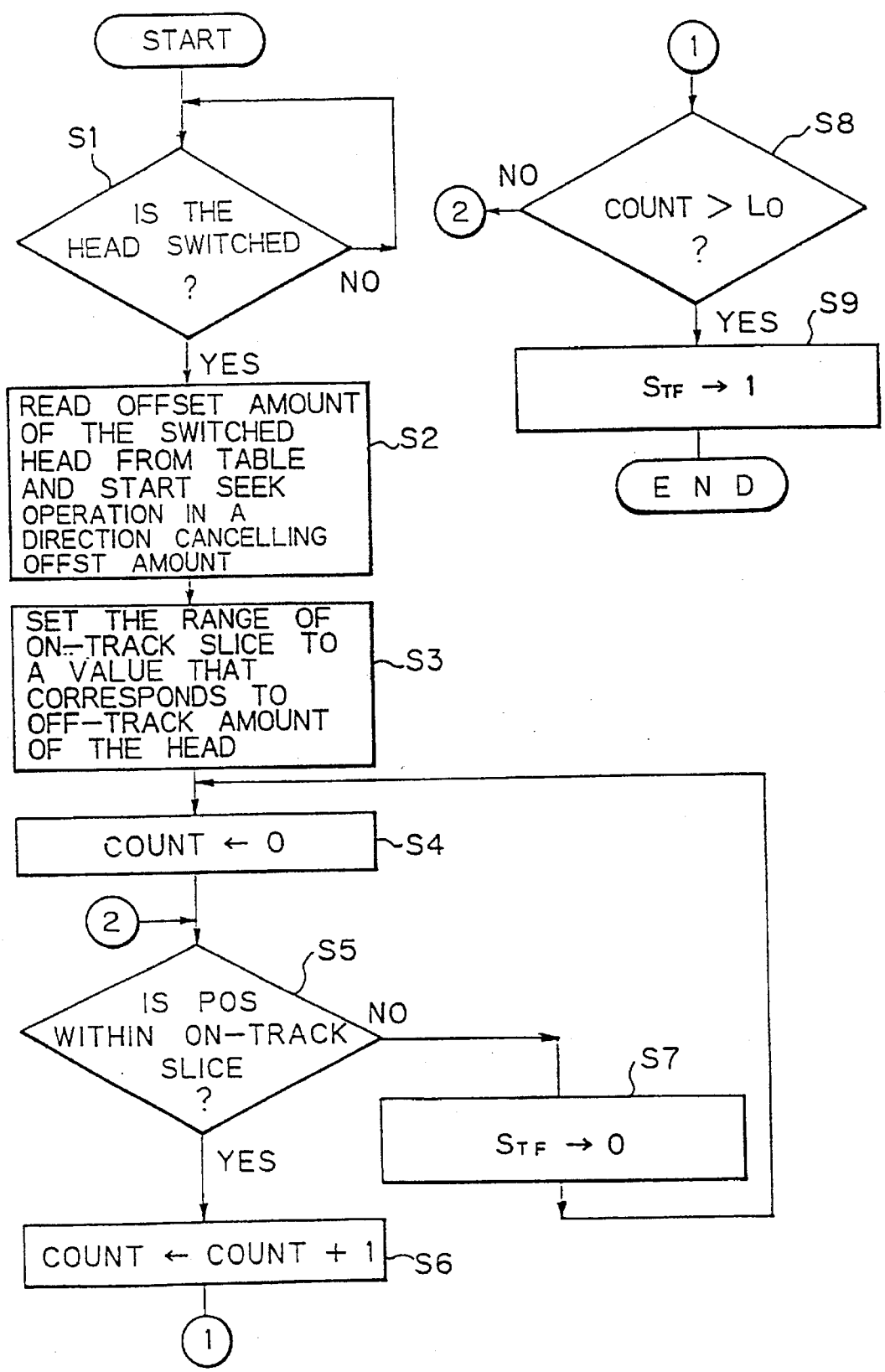
FIGS. 9 is a flowchart for explaining an on-track discrimination process according to a prior art utilizing a servo surface servo system.
Figure 10:
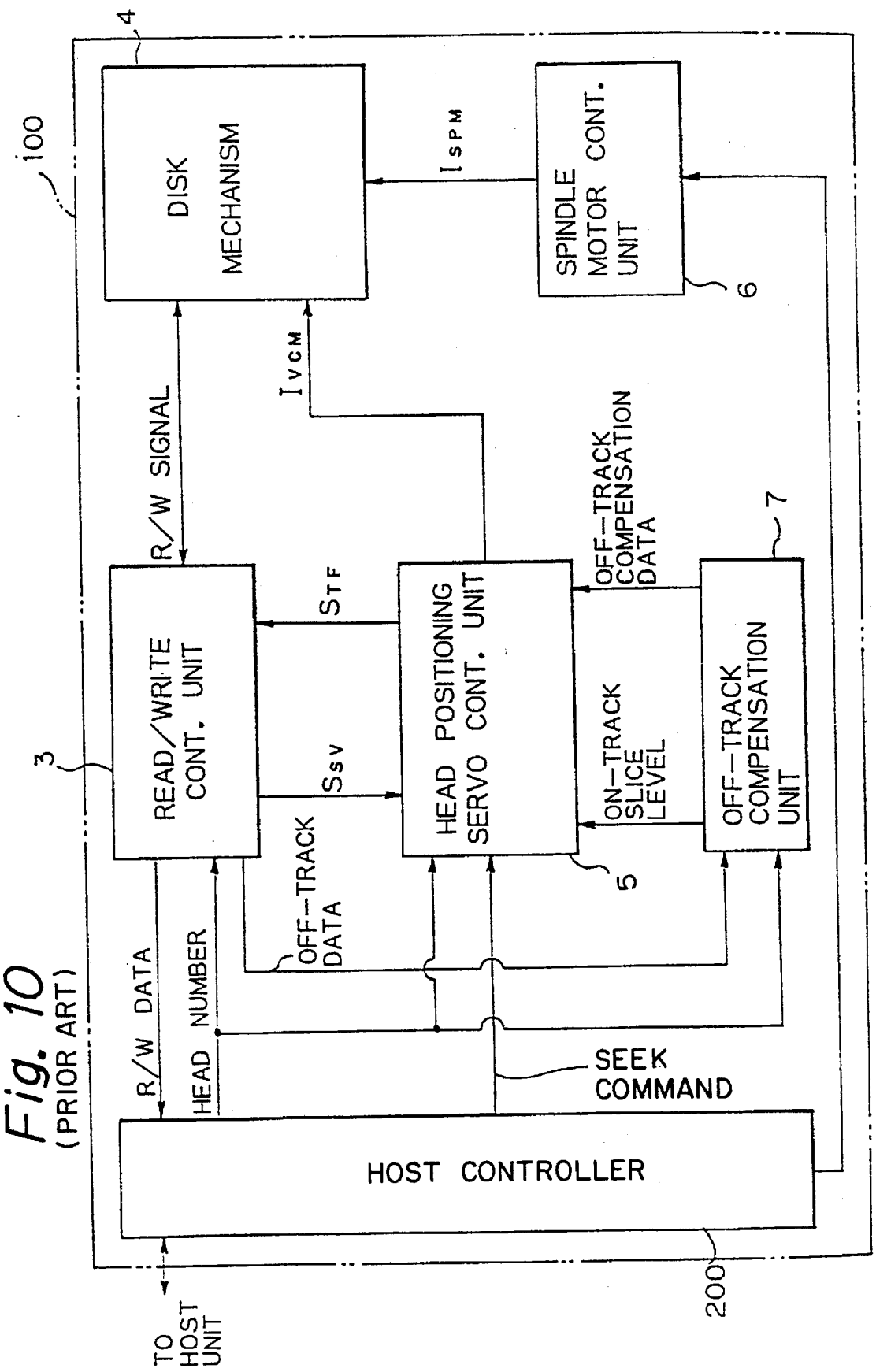
FIG. 10 is a block diagram showing an overall magnetic disk unit related to a prior art utilizing a data surface servo system.
Figure 11:
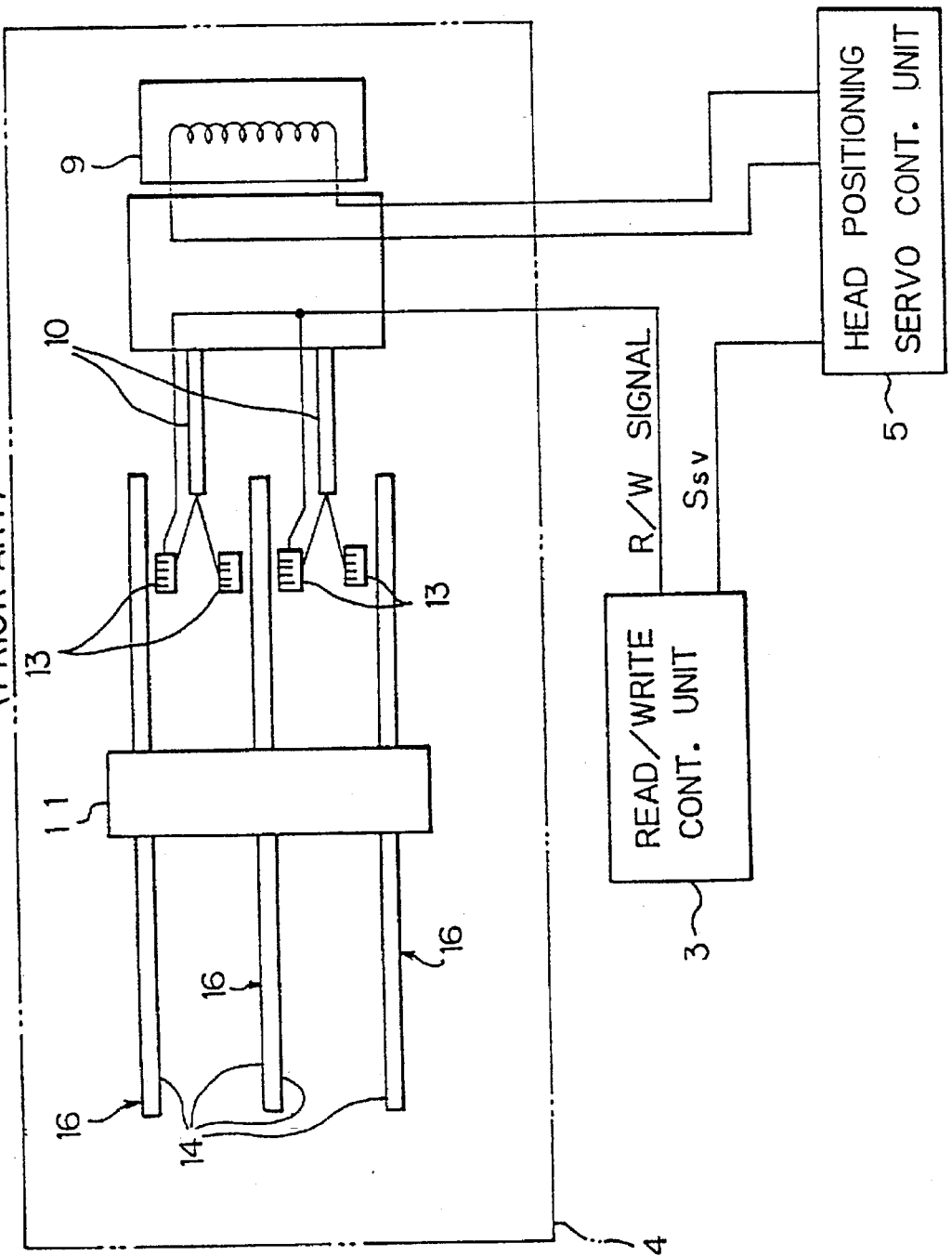
FIG. 11 is a block diagram showing a disk mechanism related to a prior art utilizing a data surface servo system.

This is the case where the off-track amount is smaller than the on-track slice level (corresponds to FIG. 8).

In FIG. 16, ① illustrates a head #1 select signal, ② illustrates a head #2 select signal, ③ illustrates a servo track center, ④ denotes an on-track signal, ⑤ illustrates a track following signal, and symbol POS denotes a position signal of the servo head.

Furthermore, symbol Wc denotes an on-track slice level of the head #1, Wd denotes an on-track slice level of the head #2, $HS_1$ denotes a timing for switching the head, and symbols "–c" and "–d" denote off-track amounts represented by adding signs.

In this example, the off-track amounts "–c" and "–d" of the heads #1 and #2 are smaller than the on-track slice levels Wc and Wd of the heads #1 and #2, and the position signal of the servo head is as shown in FIG. 16.

In such an example, it is now presumed that the head #2 is selected at the time $t_1$. With the head switching timing $HS_1$ as a reference at this moment, the past five data Last Pos 1 to Last Pos 5 (correspond to circles 1p, 2p, 3p, 4p and 5p in FIG. 16) all lie within the on-track slice level Wd of the switched head #2.

In such a case, the track following signal of high level "1" is readily output from the discrimination circuit 42 at the time $t_1$.

Therefore, the track following signal of ⑤ shown in FIG. 16 assumes high level "1" continuously before and after the time $t_1$.

When the off-track amount is smaller than the on-track slice level as described above, the track following signal can be readily made high level "1" at the head switching timing $HS_1$ as shown in FIG. 16.

Therefore, the on-track discrimination time approaches almost 0, and the on-track discrimination process can be executed at an extremely high speed.

FIG. 17 is a timing chart for explaining another example of a process according to the concrete embodiment in FIGS. 13 to 15.

Figure 7:
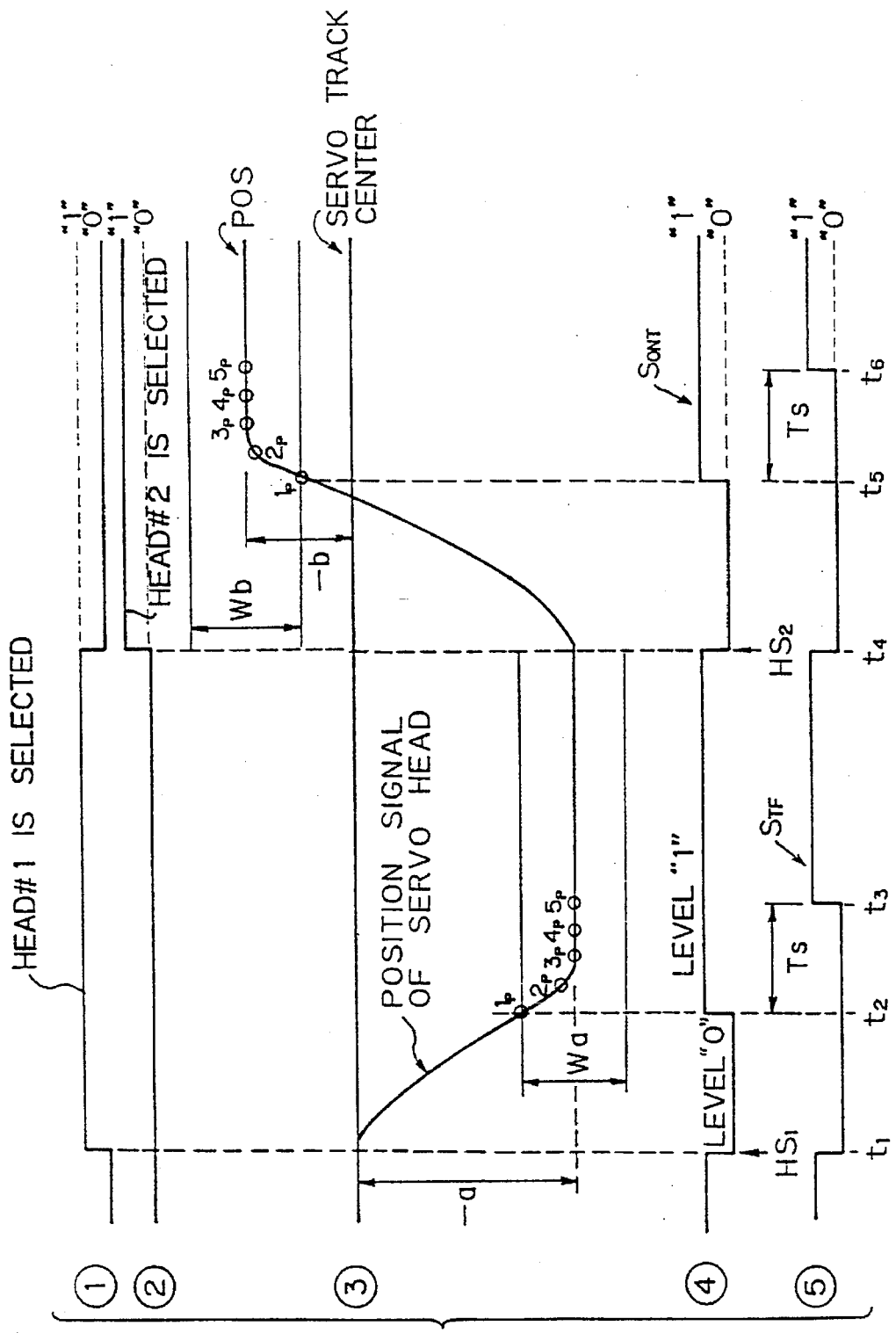
FIG. 7 is a timing chart for explaining a process of FIG. 6(A)

This is a case where the off-track amount is greater than the on-track slice level (corresponds to FIG. 7).

In this case, the off-track amounts "–a" and "–b" of the heads #1 and #2 are greater than the on-track slice levels Wa and Wb of the heads #1 and #2.

In such a case, it is now presumed that the head #1 is selected at a time $t_1$. At this moment, the position signal POS is not within the range of the on-track slice level Wa of the head #1, and the track following signal of ⑤ (output signal of the discrimination circuit 42) assumes low level "0".

Then, at a time $t_2$, the position signal POS enters the range of the on-track slice level Wa. Here, however, since the past five data Last Pos 1 to Last Pos 5 do not all lie within the range Wa, the on-track signal still assumes low level "0".

Then, at a time $t_3$, Last Pos 1 to Last Pos 5 (correspond to circles 1p, 2p, 3p, 4p and 5p in FIG. 17) all lie within the range of the on-track slice level Wa, and the discrimination circuit 42 outputs a track following signal of high level to render the discrimination that the head #1 is in the on-track condition.

Next, when the head #2 is selected at a time $t_4$, Last Pos 1 to Last Pos 5 do not all enter the range of the on-track slice level Wb of the head #2 within a period of from the time $t_4$ to a time $t_6$. Therefore, the track following signal assumes low level "0".

At the time $t_6$, however, Last Pos 1 to Last Pos 5 (corresponds to circles 1p, 2p, 3p, 4p and 5p in FIG. 17) all enter the range of the on-track slice level Wb, and whereby the discrimination circuit 42 outputs a track following signal of high level to render the discrimination that the head #2 is in the on-track condition.

As described above, even when the off-track amount is greater than the on-track slice level, the on-track condition can be discriminated within a period of time which is nearly equal to that of the prior art.

Figure 18:
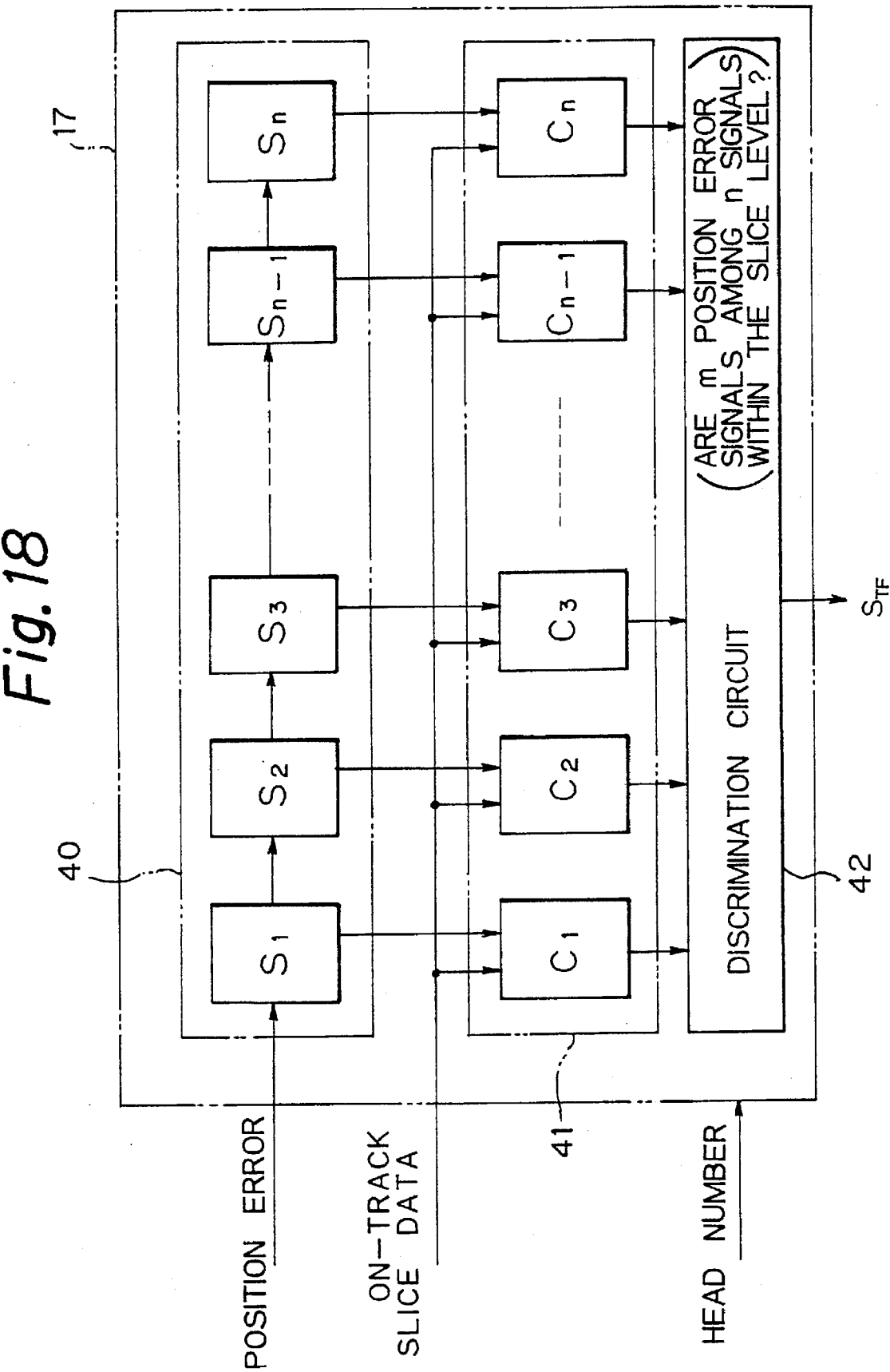
FIG. 18 is a block diagram showing an on-track discrimination circuit of another concrete embodiment according to the present invention.

FIGS. 18 to 20 are diagrams illustrating other concrete embodiments, wherein FIG. 18 is a block diagram (part 1) of the on-track discrimination circuit, FIG. 19 is a block diagram (part 2) of the on-track discrimination circuit, and FIG. 20 is a diagram illustrating the on-track discrimination process.

In FIGS. 18 to 20, the same portions as those of FIGS. 1 to 17 are denoted by the same reference numerals. Moreover, reference numeral 43 denotes a multiplier, 44 denotes an adder, and 45 denotes a comparator circuit.

FIG. 18 is a block diagram showing an on-track discrimination circuit of another concrete embodiment.

This is a case where the discrimination condition of the discrimination circuit 42 is changed in the on-track discrimination circuit 17 of the above-mentioned embodiment shown in FIG. 13.

The discrimination circuit of this embodiment (see FIG. 18) discriminates that the on-track condition is established when m (n>m) position error signals among n position error signals lie within the range of the on-track slice level.

For instance, if n=6 and m=5, it is discriminated that the on-track condition is established when five Last Pos are within the range of the on-track slice level among Last Pos 1 to Past Pos 6.

Referring to (A) of FIG. 20, it is presumed that the position signal POS has changed as shown while the on-track slice level Ws of the head (head #1 or head #2) has been set as shown.

In this case, Last Pos 1 to Last Pos 6 are all outside the range of the on-track slice level in a section from time $t_1$ to time $t_2$, and the on-track signal output from the discrimination circuit 42 remains at low level "0".

In a section from time $t_3$ to time $t_4$, however, the five Last Pos values are within the range of the on-track slice level Ws among Last Pos 1 to Last Pos 6, and the remaining one Last Pos lies outside the on-track slice level Ws.

In such a case, it is discriminated in this embodiment that the on-track condition is established, and the discrimination circuit 42 outputs an on-track signal of high level "1" at the time $t_4$.

In this embodiment, it may be so discriminated that the on-track condition is established when only one Last Pos lies outside the range of the on-track slice level among the five data of Last Pos 1 to Last Pos 5.

That is, it is discriminated that the on-track condition is established when m samples (n>m) lie within the range of the on-track slice level among n samples in a given section.

FIG. 19 is a block diagram showing an on-track discrimination circuit of still another embodiment, and FIG. 20 is a timing chart for explaining a process of FIG. 19.

This is a case where the locus of past recent position signals inclusive of the one immediately after 5 the head switching operation is regarded as time-series data, and is processed through a low pass filter, and the output thereof that is sliced is used for discriminating the on-track condition.

In this case, as the low pass filter, an FIR (finite impulse response) type digital filter is preferably used, but an IIR (infinite impulse response) filter may be used.

As shown in FIG. 19, the on-track discrimination circuit 17 of this embodiment is equipped with the shift register 40, multiplier 43, adder 44 and comparator circuit 45, in order to perform the filtering process.

In this case, the shift register 40 is the same as that of the aforementioned cases, but the multiplication units $Q_1$ to $Q_n$ in the multiplier 43 calculate products of a filter coefficient and data output from the digits $S_1$ to $S_n$ of the shift register 40, respectively.

The values of the respective products are added up together through the adder 44 and the resultant value is compared with the on-track slice data by the comparator circuit 45.

The comparator circuit 45 outputs track following signal based on the result of comparison.

For example, when the position signal POS contains noise components of high frequencies, the locus may become zig-zag in form as shown in (B) of FIG. 20.

In such a case, it is not clear whether the Last Pos lies inside or outside the range of the on-track slice level Ws in the section of from time $t_1$ to time $t_2$ shown in, for example, (B) of FIG. 20.

Therefore, the on-track condition is discriminated after the time $t_2$, and the discrimination process is retarded.

To cope with this disadvantage, therefore, the filtering process is effected using a digital filter in the on-track discrimination circuit 17 shown in FIG. 19, and the on-track condition is discriminated by the comparator circuit 45. Thus, the on-track discrimination process is carried out rapidly and accurately as shown in (C) of FIG. 20.

That is, high-frequency noise components contained in the position signals POS are removed by the filtering process (e.g., low pass filter) using the above digital filter. The position signals POS then describe a stable locus as shown in (C) of FIG. 20.

In this embodiment, therefore, Last Pos 1 to Last Pos 5 all lie within the range of the on-track slice level Ws in the section of from time $t_1$ to time $t_2$, track following signal of high level "1" is output from the comparator circuit 45 at the time $t_2$, and it is discriminated that the on-track condition is established.

In this case, it is also possible to discriminate the on-track condition by utilizing the discrimination method shown in (A) of FIG. 20, as described before.

Figure 21:
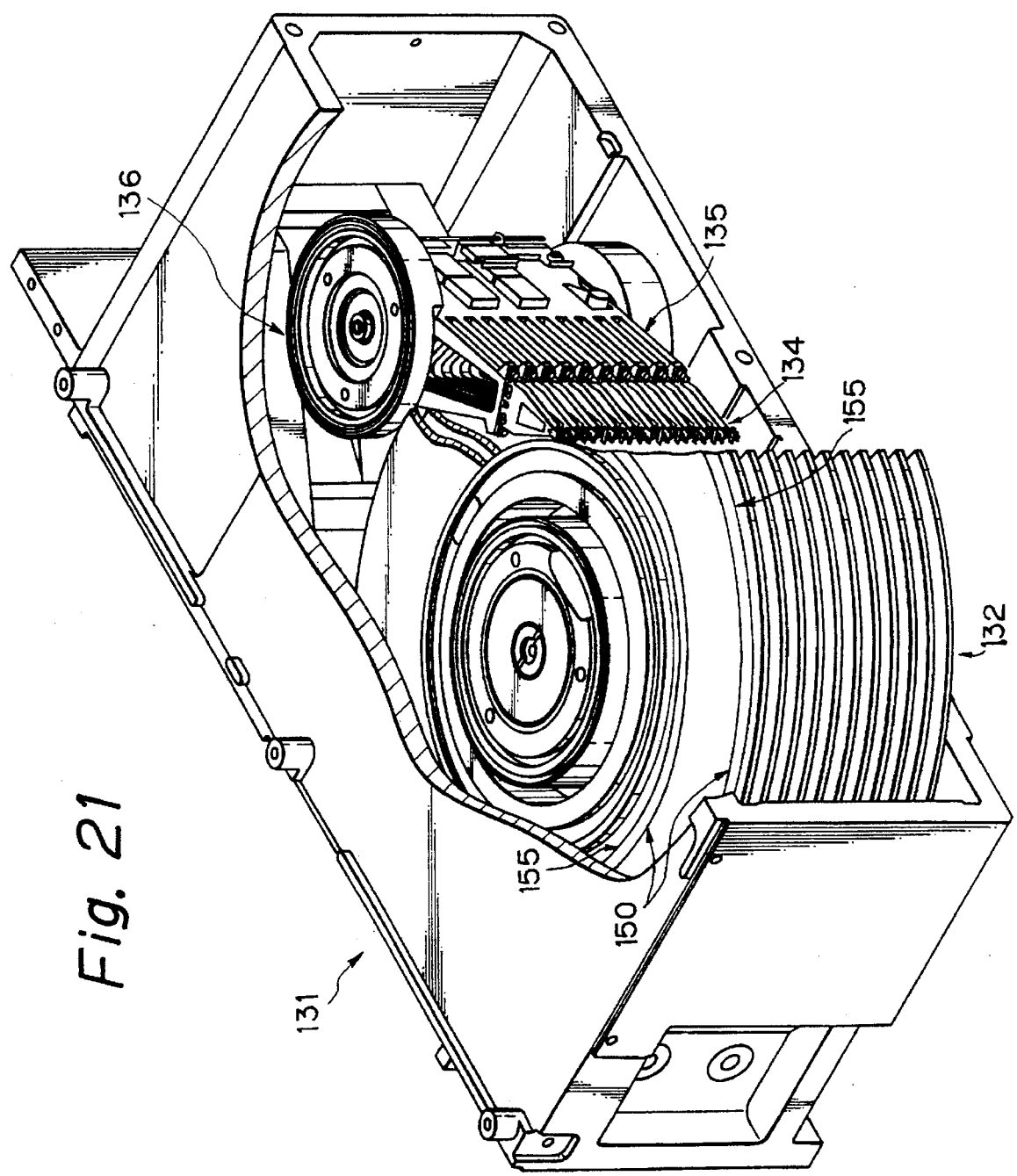
FIG. 21 is a perspective view, partially cut away, showing a mechanism of a magnetic disk unit.

Here, in order to facilitate understanding of the embodiments according to the present invention, a perspective view, partially cut away, showing a mechanism of one magnetic disk unit 131 is illustrated in FIG. 21. As seen from this figure, a plurality of disks (e.g., eleven disks) 132 are rotated simultaneously. The tracks on the recording surface of each disk 132 are written with a predetermined data pattern, and one recording surface of one disk is utilized as a servo surface. However, the tracks at both ends of the inner zone and the outer zone of the disk 132 are formed as guard bands 150 in which a particular pattern is written, instead of a data pattern, the particular pattern being used for stopping a seek operation of a plurality of heads 134. These heads 134 including a servo head are provided on the upper and the lower surfaces of each disk 132, and are supported by a plurality of arms 135 constituting an actuator 136. Further, at the inner and the outer sides of the guard bands 150, an erase zone 155 is formed for mechanically stopping the heads 134.

Further, in order to compare a head positioning control system utilizing a data surface servo system with the system utilizing a servo surface servo system described before, the construction of the head positioning control system according to the present invention utilizing a data surface servo system and the operation thereof will be described with reference to FIGS. 22 to 24.

Figure 22:
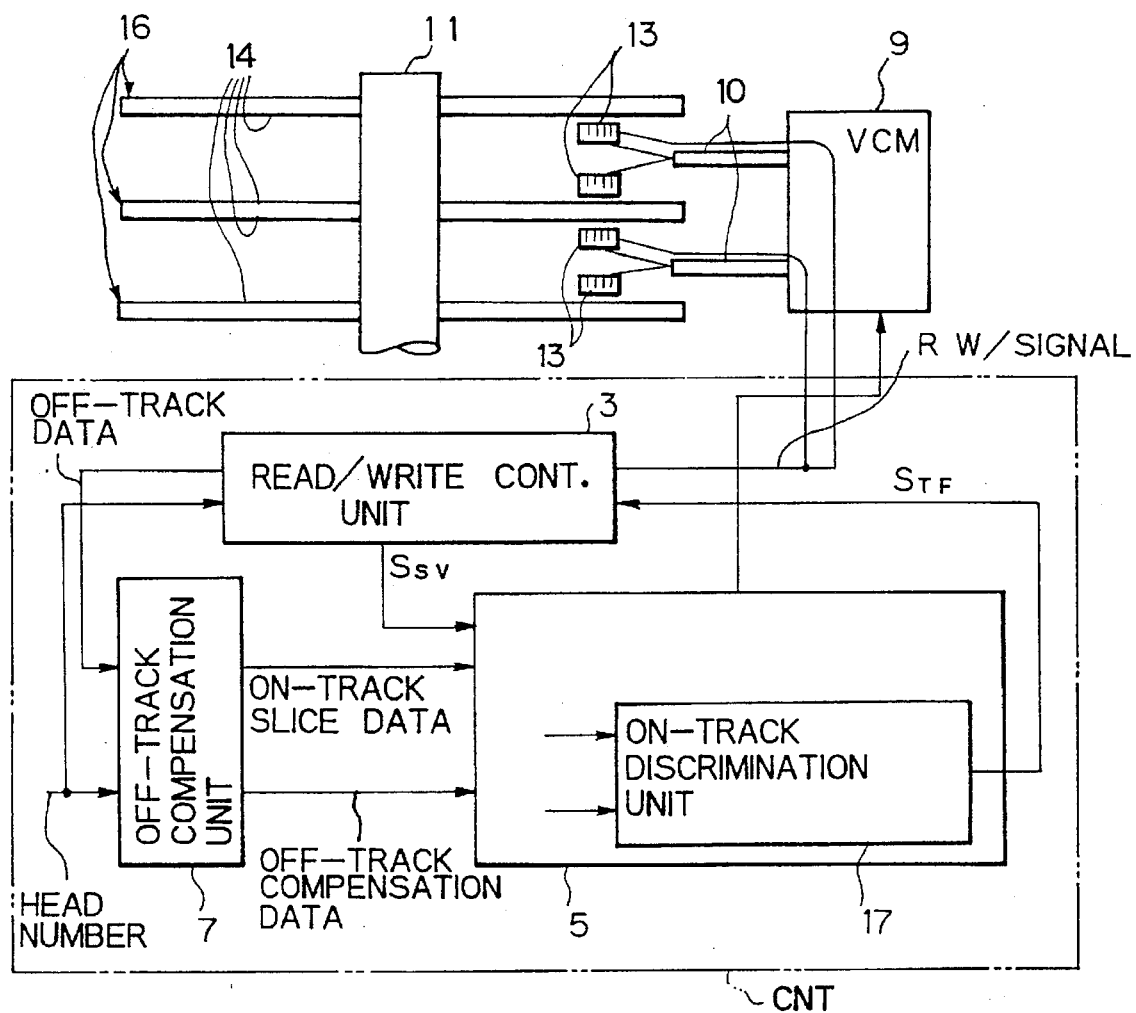
FIG. 22 is a block diagram showing an essential embodiment based on the principle of the present invention utilizing a data surface servo system.

FIG. 22 is a block diagram showing an essential embodiment based on the principle of the present invention utilizing a data surface servo system.

The construction of FIG. 22 is similar to FIG. 12(A), except that a servo surface and the corresponding servo head are not provided in FIGS. 22 and a flow of signals in FIG. 22 is partially different from that in FIG. 12(A).

To be more specific, in the control system utilizing a data surface servo system shown in FIGS. 22, a specified servo data are embedded in advance in all the tracks of each disk and the off-track amount is determined by the servo data of each respective disk. Namely, the servo data of each respective disk are read out by the data head 13 together with the normal data and are sent to a read/write control unit 3 as R/W signals. Further, the servo data input to the read/write control unit 3 is extracted from the normal data, and is sent to a head positioning servo control unit 5 as a servo signal $S_{SV}$. Further, the off-track amount is compensated by an off-track compensation unit 7, and an on-track condition is discriminated by an on-track discrimination circuit 17 in accordance with the calculated off-track compensation value and an on-track slice data, similar to FIG. 12(A).

Figure 23:
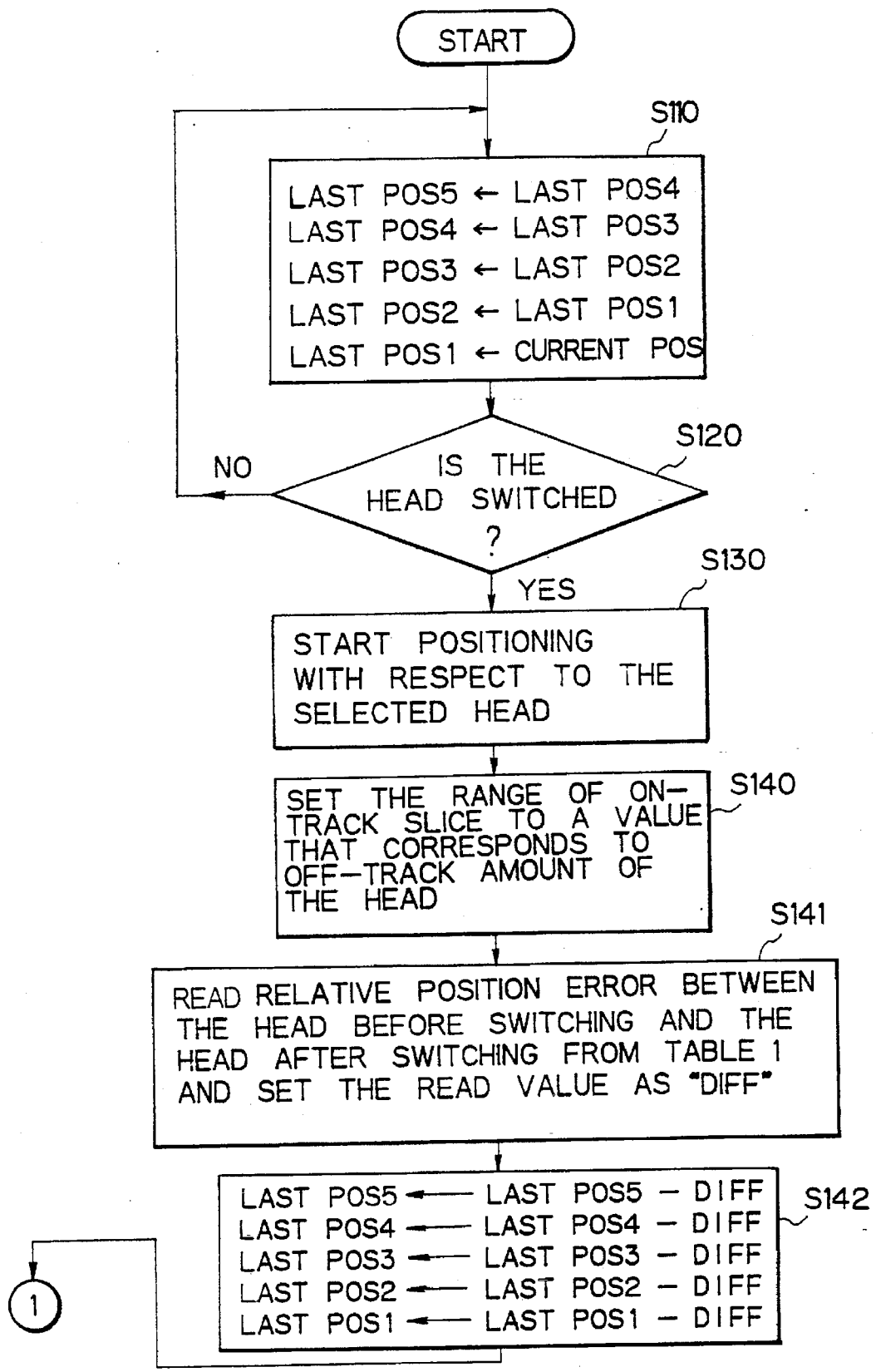
FIGS. 23 and 24 are flowcharts for explaining an on-track discrimination process of one concrete embodiment according to the present invention utilizing a data surface servo system.
Figure 24:
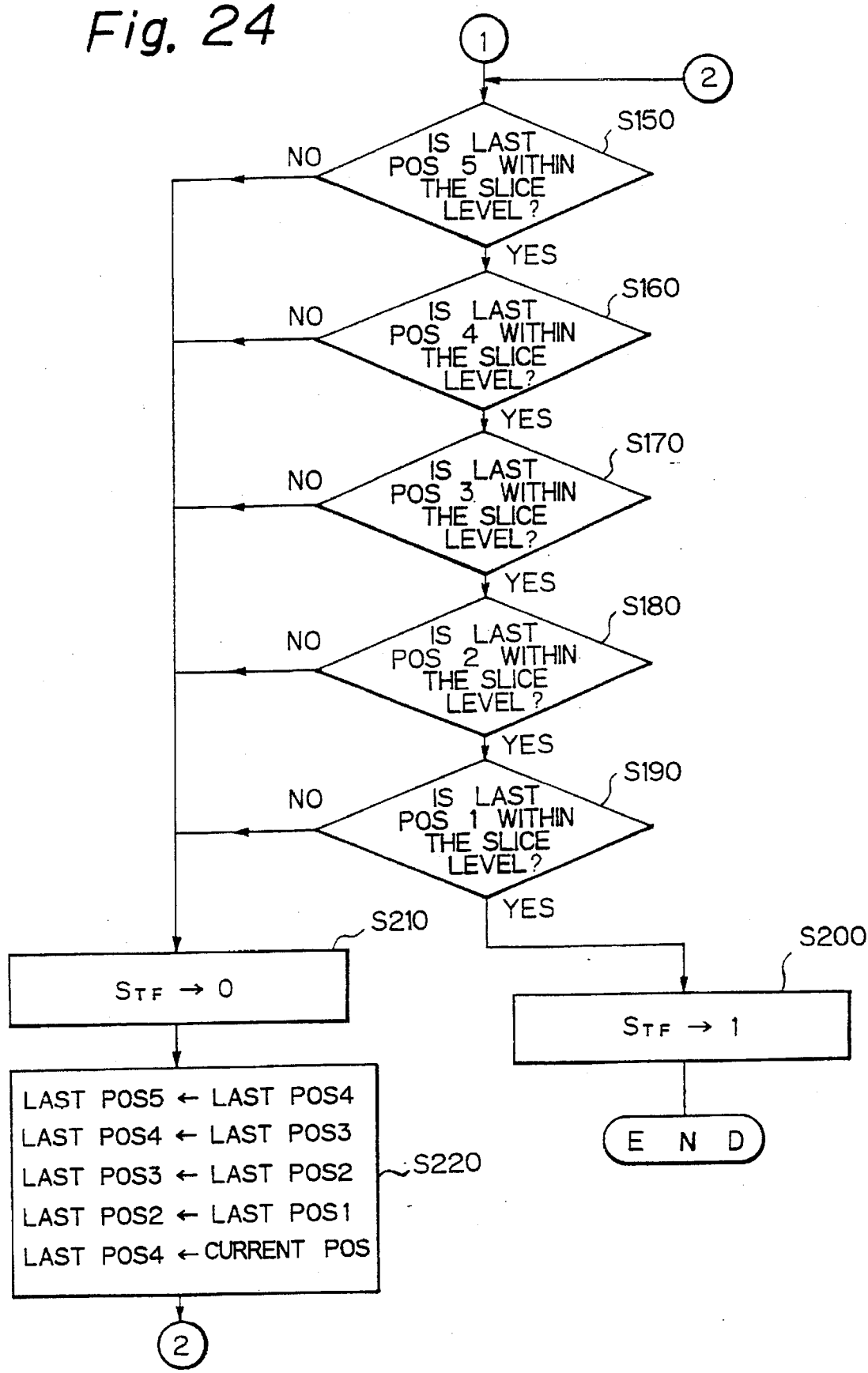

FIGS. 23 and 24 are flowcharts for explaining an on-track discrimination process of one concrete embodiment according to the present invention utilizing a data surface servo system.

The operation of FIGS. 23 and 24 is similar to that of FIGS. 14 and 15, except that a few processes of FIGS. 23 and 24 are different from those in FIGS. 14 and 15. Therefore, in this case, only the different portion of the processes will be described and the description of the remaining portion will be omitted.

To be more specific, the process number S130 in FIG. 23 is substituted for the process number S13 in FIG. 14, and the process numbers S141, S142 are newly added. Excluding the process number S130, the remaining process numbers from S110 to S220 in FIG. 23 correspond to the remaining process numbers from S11 to S22 in FIG. 14, respectively.

Figure 1:
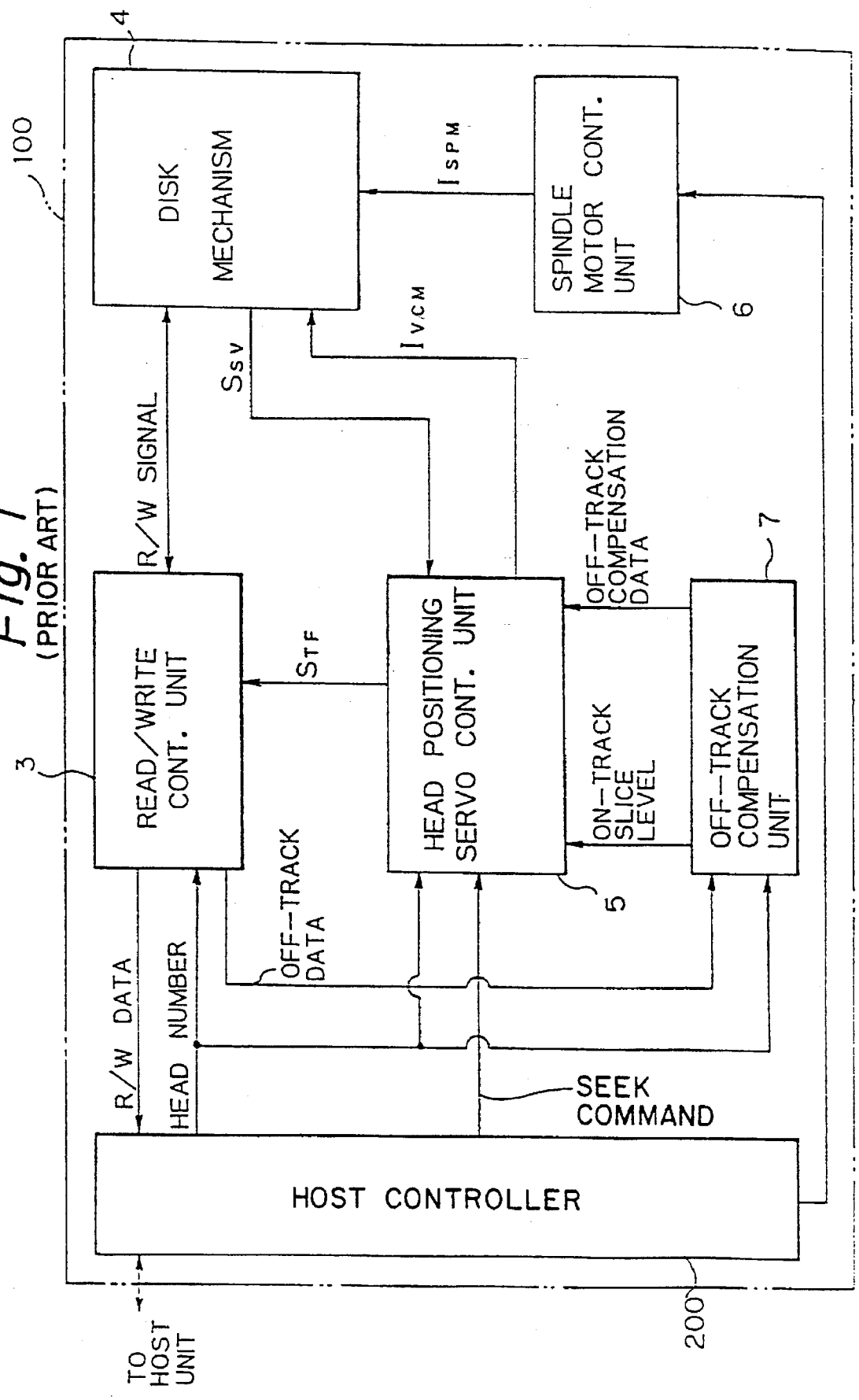
FIG. 1 is a block diagram showing an overall magnetic disk unit related to a prior art utilizing a servo surface servo system.
Figure 2:
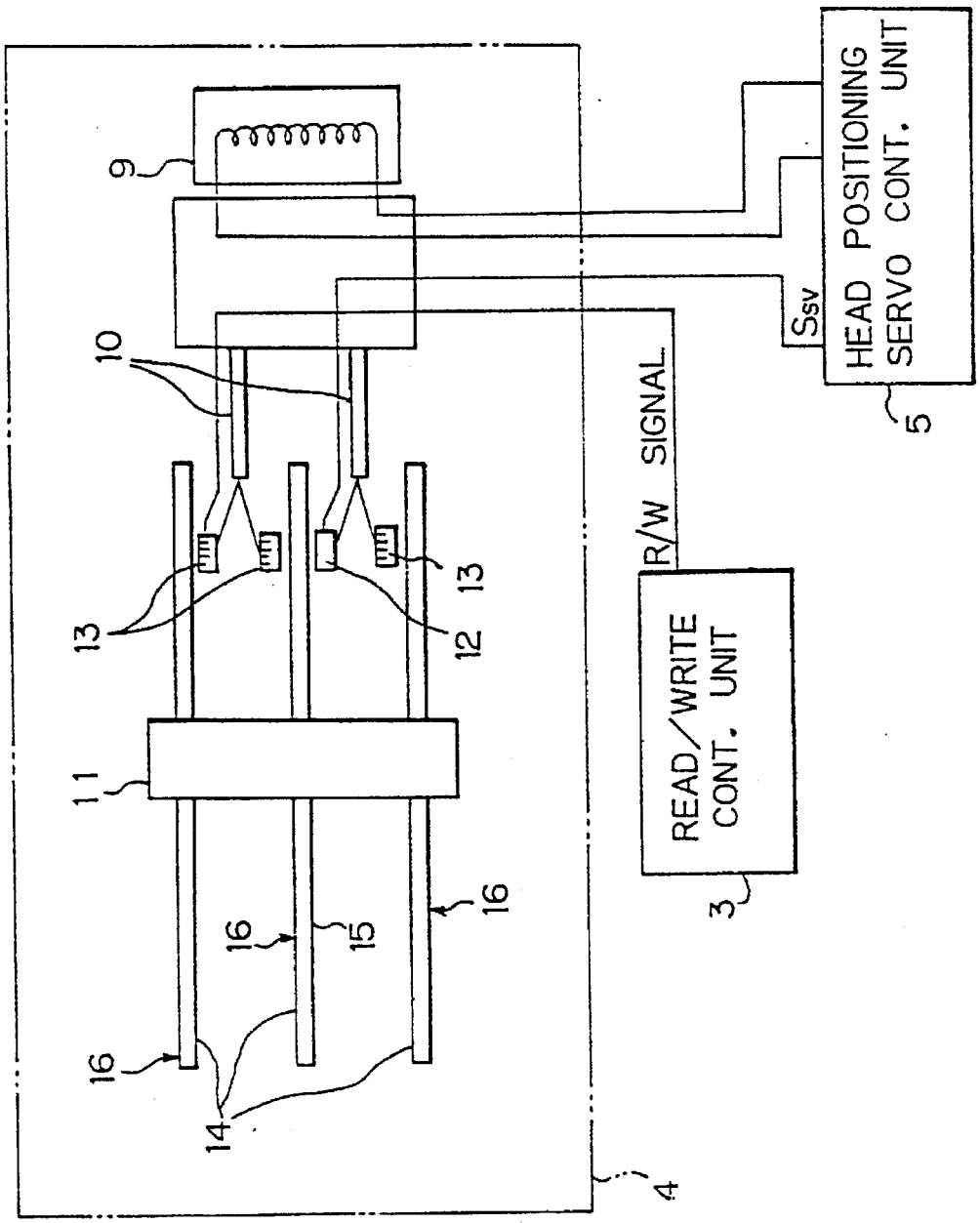
FIG. 2 is a block diagram showing a disk mechanism related to a prior art utilizing a servo surface servo system.
Figure 3:
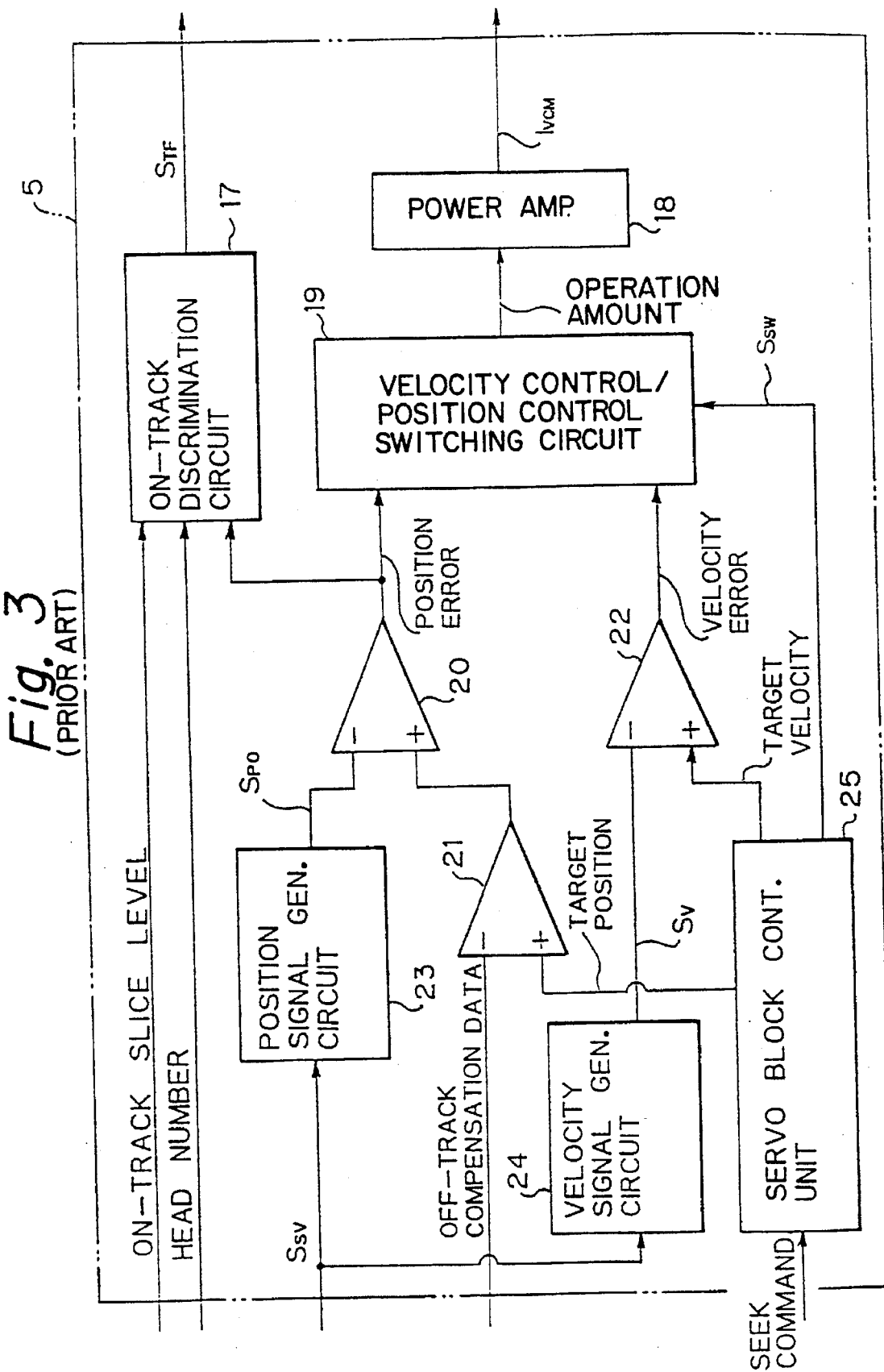
FIG. 3 is a block diagram showing a head positioning servo control circuit related to a prior art utilizing a servo surface servo system.
Figure 4:
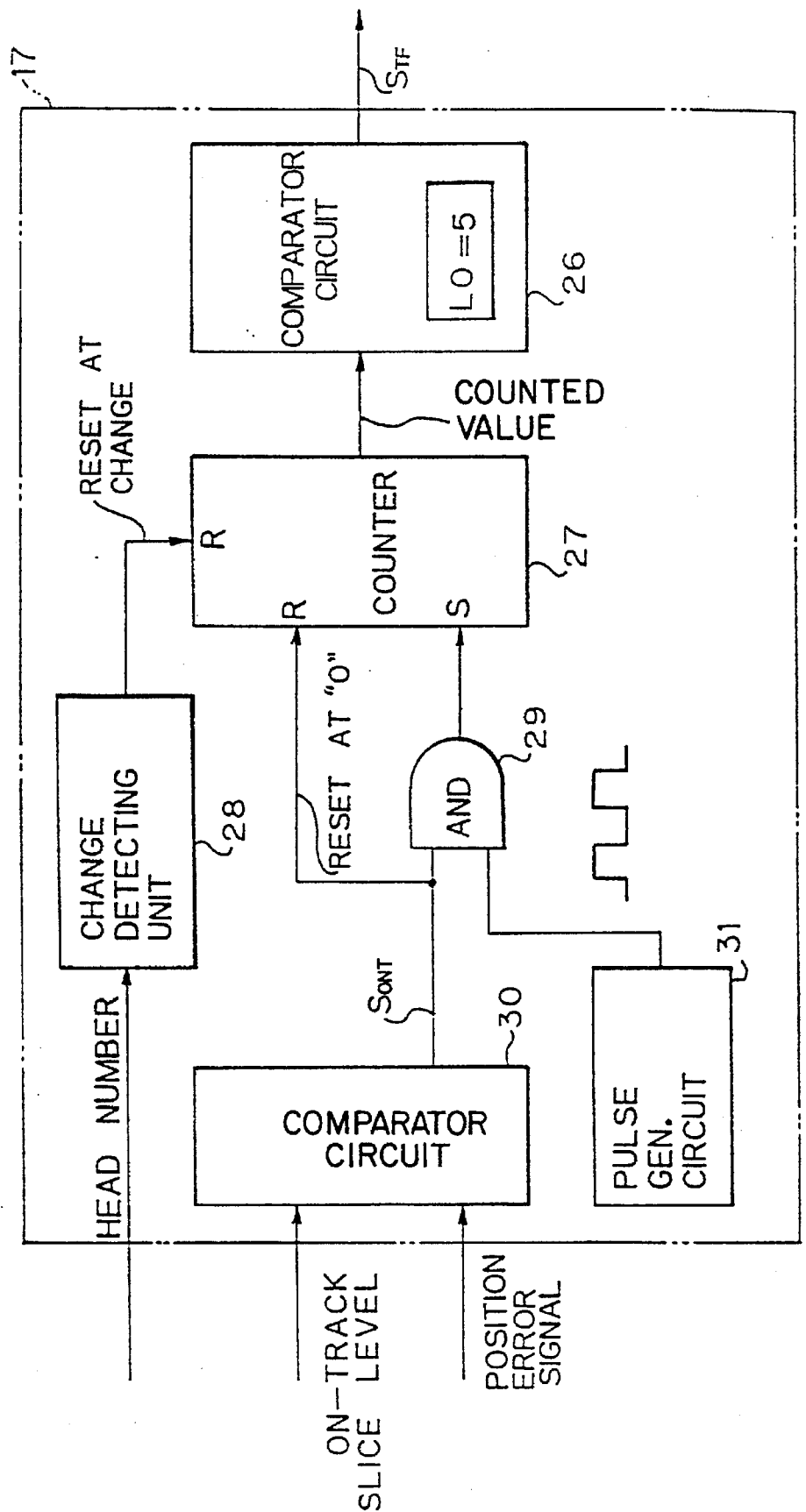
FIG. 4 is a block diagram showing an on-track discrimination circuit related to a prior art utilizing a servo surface servo system.
Figure 5:
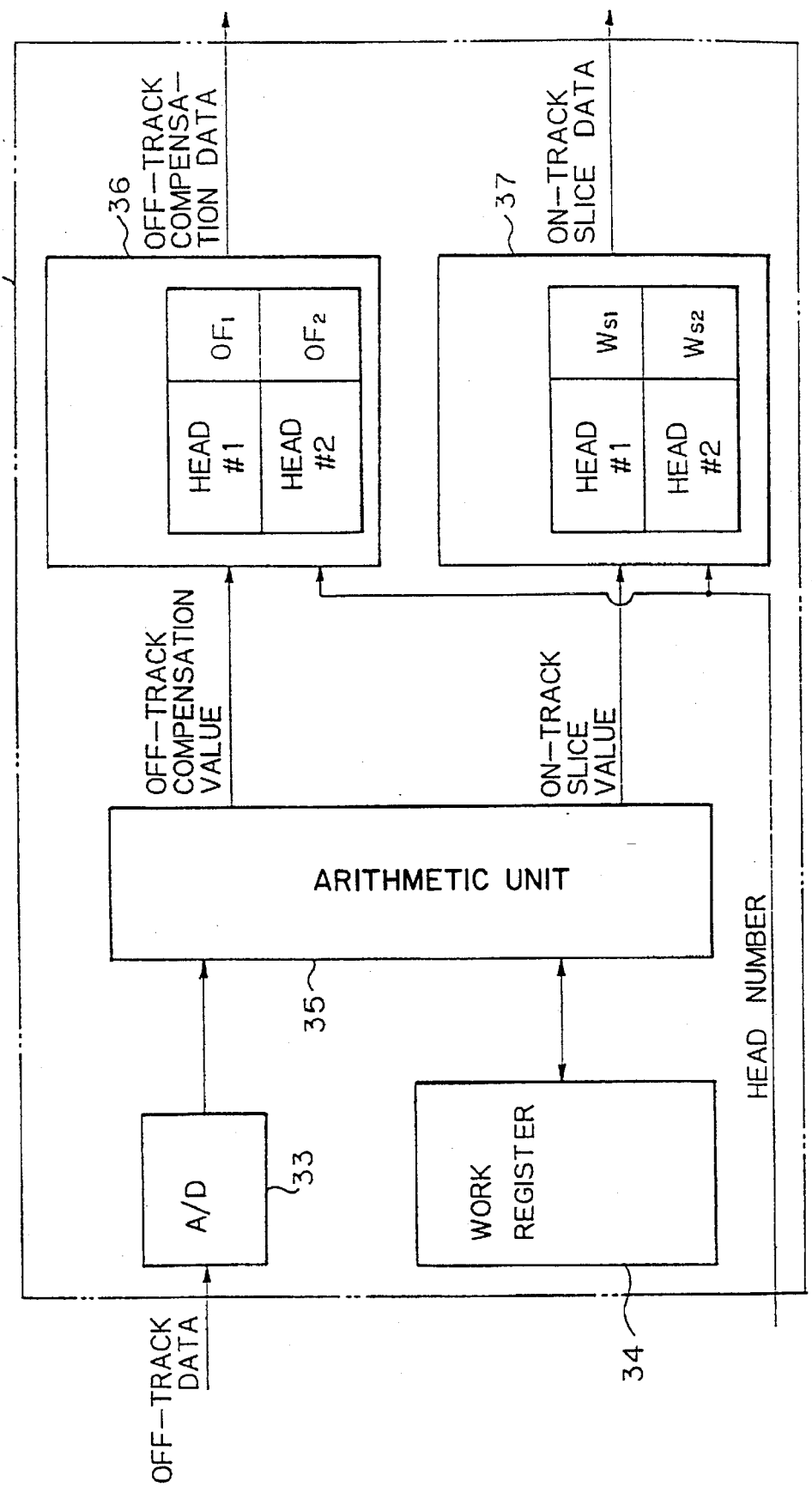
FIG. 5 is a block diagram showing an off-track compensation circuit related to a prior art utilizing a servo surface servo system.

First, in regard to S130, since a servo surface is not provided in the embodiment utilizing a data surface servo system, a head positioning process is started as soon as the desired head is selected, without referring to the table shown in FIG. 5. In other words, the selected data head is required to compensate the off-track amounts by the servo data included in that data head.

Next, in S141, a relative position error between the data head before switching and the data head after switching is read from another table shown in Table 1, and the read value is set to "DIFF". For instance, if a head #5 is selected in the place of a head #2 by the switching operation, the position errors of the head #5 and the head #2 are read as "+6" and "+5", respectively. In this case, a relative position error is 1 (DIFF=6–5).

Further, in S142, a value of "DIFF" is subtracted from each Last Pos, and a value of a position error recorded by the head before switching (#2) can be converted to a value of a position error recorded by the data head after switching (#5).

TABLE 1

| HEAD NO. | RELATIVE POSITION ERROR |
|---|---|
| 0 | 0 |
| 1 | +2 |
| 2 | +5 |
| 3 | −3 |
| 4 | +3 |
| 5 | +6 |
| 6 | −1 |
| 7 | −2 |

As described above, the preferred embodiments of the present invention give the following effects.

(1) The on-track condition is discriminated when the head is switched. In this case, a given settling time Ts results in an increase in the time for discriminating the on-track condition, in the prior art.

According to the present invention, however, the on-track condition is discriminated by evaluating the position signals retractively to the past but without employing the settling time. This makes it possible to execute the on-track discrimination process at high speed.

(2) For instance, when the off-track amount is smaller than the on-track slice level, the time required for discriminating the on-track condition can be shortened to almost zero.

(3) When the off-track amount is greater than the on-track slice level, the time required for discriminating the on-track condition may become comparable to that of the prior art. Even in this case, however, the process speed does not become lower than that of the prior art.

By taking the above-mentioned point (2) into consideration, therefore, the on-track discrimination process as a whole can be carried out at high speed.

(4) This makes it possible to shorten the access time in a magnetic disk unit or optical disk unit, and to improve performance.

The present invention is also applicable to a head positioning control system for controlling various devices other than a magnetic disk unit or optical disk unit, e.g., a magneto-optical disk unit, an erasable optical disk unit, a magnetic tape apparatus and a semiconductor disk apparatus, etc.

While the present invention has been described as related to the preferred embodiments, it will be understood that various changes and modifications may be made without departing from the spirit and the scope of the invention as hereinafter claimed.

I claim:

1. A head positioning control system comprising:

at least one head for reading and writing data from and to at least one recording medium;

head positioning means for positioning said head to a target position on said recording medium;

head positioning control means for controlling said head positioning means, wherein said head positioning control means determines whether or not said head is positioned approximately in the center of said target position by evaluating past sample data related to a history of the head position, said evaluation being performed when a position error between the current position of said head and said target position is compensated, said compensation being performed when said target position is designated, wherein said head position control means includes:

sampling means for sampling data of the head position within a predetermined sampling period;

storing means for storing the sample data as stored sample data; and discrimination means for comparing the stored sample data with a value of a target track position, and discriminating whether or not said past sample data related to a history of the head position are within an allowable range of head position errors with respect to the target track position, wherein said discrimination means determines that said head is positioned approximately in the center of said target position irrespective of whether the sample data is off-track.

2. A head positioning control system as set forth in claim 1, wherein said head discrimination means is operative to determine that said head is positioned approximately in the center of said target position, when sampling data of a plurality of consecutive position errors are all within the range of a predetermined value.

3. A head positioning control system as set forth in claim 1, wherein said head discrimination means is operative to determine that said head is positioned approximately in the center of said target position, when m sampling data excluding some sampling data, among n sampling data of a plurality of consecutive position errors, are within the range of a predetermined value.

4. A head positioning control system as set forth in claim 1, wherein said storing means further stores said past sample data, and said past sample data was obtained by said sampling means during a previous head positioning operation.

5. A head positioning control system comprising:

a plurality of disks having surfaces in which any one surface thereof is a servo surface and the other surfaces thereof are data surfaces;

a servo head arranged on the side of said servo surface;

a plurality of data heads arranged on the side of said data surfaces respectively;

a positioning mechanism for positioning said servo head and said plurality of data heads to target tracks on said plurality of disks respectively;

a control unit for controlling said positioning mechanism, by reading servo information on said data surfaces, to calculate off-track compensation data based on said servo information and to update said off-track compensation data, wherein said control unit is operative to use an on-track slice level determined by said off-track mount of a newly selected data head when a certain data head is switched to said newly selected data head, and to discriminate whether or not said newly selected data head is on-track by evaluating position signals of said servo head including position signals obtained just after said certain data head is switched to said newly selected data head, and by evaluating past sample data related to a history of the head position, wherein said control unit includes:

sampling means for sampling data of the head position within a predetermined sampling period;

storing means for storing the sample data as stored sample data; and discrimination means for comparing the stored sample data with a value of a target track position, and discriminating whether or not said past sample data related to a history of the head position are within an allowable range of head position errors with respect to the target track position, wherein said discrimination means determines that said newly selected data head is on-track irrespective of whether the sample data is off-track.

6. A head discrimination system as set forth in claim 5, wherein said control unit is operative to determine that said newly selected data head is on-track, when sampling data of a plurality of consecutive position errors obtained from said position signals are all within the range of said on-track slice level.

7. A head positioning control system as set forth in claim 6, wherein said discrimination means is operative to regard a locus of said past sample data related to a history of the head position as time-series data and to process said time-series data by means of a low pass filter, and wherein said discrimination means is operative to determine that said newly selected data head is on-track by evaluating said processed time-series data.

8. A head discrimination system as set forth in claim 5, wherein said control unit is operative to determine that said newly selected data head is on-track, when m sampling data excluding some sampling data, among n sampling data of a plurality of consecutive position errors obtained from said position signals, are within the range of a predetermined value.

9. A head positioning control system as set forth in claim 8, wherein said discrimination means is operative to regard a locus of said past sample data related to a history of the head position as time-series data and to process said time-series data by means of a low pass filter, and wherein said discrimination means is operative to determine that said newly selected data head is on-track by evaluating said processed time-series data.

10. A head positioning control system as set forth in claim 5, wherein said discrimination means is operative to regard a locus of said past sample data related to a history of the head position as time-series data and to process said time-series data by means of a low pass filter, and wherein said discrimination means is operative to determine that said newly selected data head is on-track by evaluating said processed time-series data.

11. A head positioning control system as set forth in claim 5, wherein said storing means further stores said past sample data, and said past sample data was obtained by said sampling means during a previous head positioning operation.

12. A head positioning control system comprising:

a plurality of disks having surfaces, all the surfaces being data surfaces;

a plurality of data heads arranged on the side of said data surfaces respectively;

a positioning mechanism for positioning said plurality of data heads to target tracks on said plurality of disks respectively; and a control unit for controlling said positioning mechanism, by reading servo information on said data surfaces, to calculate off-track compensation data based on said servo information and to update said off-track compensation data, wherein said control unit is operative to use an on-track slice level determined by said off-track amount of a newly selected data head when a certain data head is switched to said newly selected data head, and to discriminate whether or not said newly selected data head is on-track by evaluating position signals of said data head including position signals obtained just after said certain data head is switched to said newly selected data head, and by evaluating past sample data, including any off-track sample data, related to a history of the head position, wherein said control unit includes:

sampling means for sampling data of the head position with a predetermined sampling period;

storing means for storing the sample data as stored sample data; and discrimination means for comparing the stored sample data with a value of a target track position, and discriminating whether or not said past sample data related to a history of the head position are within an allowable range of head position errors with respect to the target track position, wherein said discrimination means determines that said newly selected data head is on-track irrespective of whether the sample data is off-track.

13. A head discrimination system as set forth in claim 12, wherein said control unit is operative to determine that said newly selected data head is on-track, when sampling data of a plurality of consecutive position errors obtained from said position signals are all within the range of said on-track slice level.

14. A head positioning control system as set forth in in claim 13, wherein said discrimination means is operative to regard a locus of said past sample data related to a history of the head position as time-series data and to process said time-series data by means of a low pass filter, and wherein said discrimination means is operative to determine that said newly selected data head is on-track by evaluating said processed time-series data.

15. A head discrimination system as set forth in claim 12, wherein said control unit is operative to determine that said newly selected data head is on-track, when m sampling data excluding some sampling data, among n sampling data of a plurality of consecutive position errors obtained from said position signals, are within the range of a predetermined value.

16. A head positioning control system as set forth in claim 15, wherein said discrimination means is operative to regard a locus of said past sample data related to a history of the head as time-series data and to process said time-series data by means of a low pass filter, and wherein said discrimination means is operative to determine that said newly selected data head is on-track by evaluating said processed time-series data.

17. A head positioning control system as set forth in claim 12, wherein said discrimination means is operative to regard a locus of said past sample data related to a history of the head position as time-series data and to process said time-series data by means of a low pass filter, and wherein said discrimination means is operative to determine that said newly selected data head is on-track by evaluating said processed time-series data.

18. A head positioning control system as set forth in claim 12, wherein said storing means further stores said past sample data, and said past sample data was obtained by said sampling means during a previous head positioning operation.

* * * * *

UNITED STATES PATENT AND TRADEMARK OFFICE
CERTIFICATE OF CORRECTION

PATENT NO. : 5,661,617  Page 1 of 2
DATED : Aug. 26, 1997
INVENTOR(S) : Nobuyuki Suzuki It is certified that error appears in the above-indentified patent and that said Letters Patent is hereby corrected as shown below:

On the title page

Under "[57] Abstract", line 2, delete "carded" and insert --carried-- therefor.

Column 4, line 17, delete "18.," and insert --18.-- therefor.

Column 5, line 15, delete "5".

Column 10, line 2, delete "10".

Column 10, line 41, delete "FIG. 20" and insert --FIGS. 20-- therefor.

UNITED STATES PATENT AND TRADEMARK OFFICE
CERTIFICATE OF CORRECTION

PATENT NO. : 5,661,617
DATED : Aug. 26, 1997
INVENTOR(S) : Nobuyuki Suzuki

It is certified that error appears in the above-indentified patent and that said Letters Patent is hereby corrected as shown below:

Column 12, line 53, delete "$S_i \rightarrow S_2$" and insert

--$S_1 \rightarrow S_2$-- therefor.

Column 13, line 42, delete "5" (second occurrence).

Column 14, line 12, delete "10".

Column 16, line 10, delete "5".

Column 19, line 57, delete "mount" and insert

--amount-- therefor.

Signed and Sealed this

Eighteenth Day of August, 1998

*Attest:*

BRUCE LEHMAN

*Attesting Officer*     *Commissioner of Patents and Trademarks*